United States Patent
Zee et al.

(10) Patent No.: US 10,736,167 B2
(45) Date of Patent: Aug. 4, 2020

(54) METHOD AND A FIRST NODE FOR DECOUPLING SCTP AND S1AP

(71) Applicant: TELEFONAKTIEBOLAGET LM ERICSSON (PUBL), Stockholm (SE)

(72) Inventors: Oscar Zee, Stockholm (SE); Angelo Centonza, Stockholm (SE); Gunnar Mildh, Sollentuna (SE); Claudio Porfiri, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 16/092,857

(22) PCT Filed: Apr. 7, 2017

(86) PCT No.: PCT/IB2017/052027
§ 371 (c)(1),
(2) Date: Oct. 11, 2018

(87) PCT Pub. No.: WO2017/178944
PCT Pub. Date: Oct. 19, 2017

(65) Prior Publication Data
US 2019/0208563 A1    Jul. 4, 2019

Related U.S. Application Data

(60) Provisional application No. 62/321,303, filed on Apr. 12, 2016, provisional application No. 62/321,038, filed on Apr. 11, 2016.

(51) Int. Cl.
H04W 76/19    (2018.01)
H04W 80/12    (2009.01)
(Continued)

(52) U.S. Cl.
CPC ........ *H04W 76/19* (2018.02); *H04L 65/1003* (2013.01); *H04W 76/12* (2018.02);
(Continued)

(58) Field of Classification Search
None
See application file for complete search history.

(56) References Cited

U.S. PATENT DOCUMENTS 8,885,500 B2 * 11/2014 Lindqvist .............. H04W 24/02
370/252
10,470,108 B2 * 11/2019 Kim ..................... H04B 17/327
(Continued)

OTHER PUBLICATIONS

3rd Generation Partnership Project, "3rd Generation Partnership Project; Technical Specification Group Radio Access Network; Home (e)NodeB; Network aspects (Release 8)", Technical Report, 3GPP TR R3.020 V0.9.1, pp. 1-68, Nov. 2018, 3GPP, France.
(Continued)

*Primary Examiner* — Bunjob Jaroenchonwanit

(57) ABSTRACT

A method in a first network node comprises exchanging identifiers with a second network node, the exchanged identifiers for use in reestablishing a first S1 Application Protocol (S1AP) connection with the second network node associated with a first Stream Control Transmission Protocol (SCTP) connection between the first network node and the second network node. The method comprises storing the identifiers in association with an S1AP context, and sending, in response to a determination that the first S1AP connection with the second network node should be suspended, a request to suspend the first S1AP connection to the second network node. The method comprises reestablishing the first S1AP connection with the second network node using at least one of the stored identifiers, wherein the reestablished first S1AP connection is associated with the second SCTP
(Continued)

connection between the first network node and the second network node.

20 Claims, 26 Drawing Sheets

(51) Int. Cl.
| | |
|---|---|
| H04W 76/20 | (2018.01) |
| H04W 76/12 | (2018.01) |
| H04W 76/38 | (2018.01) |
| H04L 29/06 | (2006.01) |
| H04W 84/04 | (2009.01) |
| H04W 76/11 | (2018.01) |

(52) U.S. Cl.
CPC .......... *H04W 76/20* (2018.02); *H04W 76/38* (2018.02); *H04W 80/12* (2013.01); *H04W 76/11* (2018.02); *H04W 84/042* (2013.01)

(56) References Cited

U.S. PATENT DOCUMENTS

| | | | | |
|---|---|---|---|---|
| 2012/0069737 | A1* | 3/2012 | Vikberg | H04W 28/12 370/232 |
| 2012/0069817 | A1* | 3/2012 | Ling | H04W 36/14 370/331 |
| 2012/0167100 | A1* | 6/2012 | Li | G11C 16/102 718/102 |
| 2013/0136032 | A1* | 5/2013 | Meirosu | H04W 8/02 370/254 |
| 2013/0260811 | A1* | 10/2013 | Rayavarapu | H04W 76/19 455/509 |
| 2013/0322346 | A1* | 12/2013 | Comeau | H04W 80/02 370/329 |
| 2014/0018083 | A1* | 1/2014 | Laraqui | H04W 84/042 455/446 |
| 2014/0098736 | A1* | 4/2014 | Centonza | H04L 12/2856 370/315 |
| 2014/0295884 | A1* | 10/2014 | Racz | H04W 24/00 455/456.1 |
| 2015/0016306 | A1* | 1/2015 | Masini | H04W 76/12 370/255 |
| 2015/0201455 | A1* | 7/2015 | Redding | H04L 1/004 455/41.2 |
| 2016/0135166 | A1* | 5/2016 | Cilli | H04W 8/24 370/329 |
| 2017/0251370 | A1* | 8/2017 | Liljenstam | H04W 12/10 |
| 2018/0206137 | A1* | 7/2018 | Ryu | H04W 4/70 |
| 2018/0343698 | A1* | 11/2018 | Mitsui | H04W 76/20 |
| 2019/0045572 | A1* | 2/2019 | Kim | H04W 76/19 |
| 2019/0052435 | A1* | 2/2019 | Martin | H04W 4/70 |
| 2019/0313295 | A1* | 10/2019 | Xu | H04W 40/36 |

OTHER PUBLICATIONS

RAN3, UE context retention at SCTP recovery, R3-160559, R2-162033, Change Request 36.300, CR 0858, 3GPP TSG-RAN WG2 Meeting #93, St. Julian's, Malta, Feb. 15-19, 2016.

Alcatel-Lucent, Alternative solution for the SCTP endpoint failure issue, R3-080672, 3GPP TSG RAN3#59bis, Shenzhen, China, Mar. 31-Apr. 3, 2008.

\* cited by examiner

METHOD AND A FIRST NODE FOR DECOUPLING SCTP AND S1AP

This application is a 371 of International Application No. PCT/IB2017/052027, filed Apr. 7, 2017, the disclosure of which is fully incorporated herein by reference. The present application claims the benefit of priority from U.S. Provisional Application No. 62/321,038 entitled "DECOUPLING SCTP and S1AP" filed Apr. 11, 2016, the disclosure of which is hereby incorporated herein in its entirety by reference.

TECHNICAL FIELD

The present disclosure relates, in general, to wireless communications and, more particularly, to decoupling SCTP and S1AP.

BACKGROUND

FIG. 1 illustrates an example Long Term Evolution (LTE) architecture. The example architecture of FIG. 1 includes a plurality of radio access nodes, such as evolved NodeBs (eNBs), Home eNBs (HeNBs) and an HeNB gateway (HeNB GW). The LTE architecture shown in FIG. 1 also includes evolved packet core (EPC) nodes, such as Mobility Management Entities (MMEs) and Serving-Gateways (S-GWs). FIG. 1 further illustrates the logical interfaces between the various nodes. As shown in the example of FIG. 1, the eNBs and HeNBs interface over an X2 interface, and the eNB/HeNBs interface with the MME/S-GW/HeNB GW over an S1 interface. In other words, an S1 interface connects HeNBs/eNBs to the MME/S-GW and HeNBs to the HeNB GW, while an X2 interface connects peer eNBs/HeNBs, optionally via an X2 GW. The radio access nodes may communicate wirelessly with user equipment (UEs) (not shown).

FIG. 2 illustrates an exemplary management system architecture. In the example of FIG. 2, the node elements (NE) (also referred to, for example, as eNBs) are managed by a domain manager (DM) (also referred to as the operation and support system (OSS)). A DM may further be managed by a network manager (NM). Two NEs are interfaced by X2, whereas the interface between two DMs is referred to as Itf-P2P. The management system may configure the network elements, as well as receive observations associated to features in the network elements. For example, the DM observes and configures NEs, while the NM observes and configures the DM, as well as NE via DM. By means of configuration via the DM, NM and related interfaces, functions over the X2 and S1 interfaces may be carried out in a coordinated way throughout the RAN, eventually involving the Core Network (i.e., MME and S-GWs).

The overall principles of the various embodiments described herein would work for both an LTE-like architecture and a new architecture based on an evolution of the S1 interface (e.g., an architecture with evolved counterparts of the S1, X2 and Uu interfaces and which further provides that any new radio access technology (RAT) would be integrated with the LTE radio interface at radio access network (RAN) level in a similar fashion as the way LTE Dual Connectivity (DC) is defined). An example of an evolved architecture is a 5G architecture.

The S1 Control Plane interface is defined between MME and eNB, and is described in the Third Generation Partnership Project (3GPP) specifications TS 36.300, TS 36.410, TS 36.411, TS 36.412 and TS 36.413.

FIG. 3 illustrates an exemplary control plane stack. The control plane stack of FIG. 3 includes a physical layer 302, a data link layer 304, an Internet Protocol (IP) layer 306, a Stream Control Transmission Protocol (SCTP) layer 308, and an S1 Application Protocol (S1AP) layer 310. In the example of FIG. 3, the transport network layer 306 is based on IP transport. On top of IP layer 306, SCTP layer 308 is added for reliable transport of signaling messages.

Only one single SCTP association is established between one MME and eNB pair. Within the SCTP association established between one MME and eNB pair, one single pair of stream identifiers is reserved for the sole use of S1AP elementary procedures that utilize non UE-associated signaling, and at least one (and up to a few) pair(s) of stream identifiers are reserved for the sole use of S1AP elementary procedures that utilize UE-associated signaling. Also, single UE-associated signaling uses one SCTP stream and the stream should not be changed during the communication of the UE-associated signaling.

FIG. 4 illustrates a state transition diagram of S1AP. More particularly, FIG. 4 illustrates transitions between two states, S1AP CONNECTED state 402 and S1AP DISCONNECTED state 404. In case the SCTP layer (e.g., SCTP layer 308 described above in relation to FIG. 3) notifies the S1AP layer (e.g., S1AP layer 310 described above in relation to FIG. 3) that the signaling connection broke, the entire S1AP will then be reset on both endpoints. In other words, the MME locally changes the state of the UEs that used this signaling connection to the ECM-IDLE state, and the eNB releases the Radio Resource Control (RRC) connection with those UEs. This is reflected in the state diagram as arrow 406 from S1AP CONNECTED state 402 to S1AP DISCONNECTED state 404 with action "Broken lower layer."

As shown in the example of FIG. 4, transitions from S1AP DISCONNECTED state 404 to S1AP CONNECTED state may be achieved via an S1 setup procedure, reflected in the state diagram as arrow 408 from S1AP DISCONNECTED state 408 to S1AP CONNECTED state 402 with action "S1 Setup." Similarly, the S1 Setup procedure may take place within S1AP CONNECTED state 402, reflected in the state diagram as arrow 410 from S1AP CONNECTED state 402 to S1AP CONNECTED state 402 with action "S1 Setup." The S1 setup procedure is described in more detail below in relation to FIG. 5.

FIG. 5 illustrates an example of a successful S1 setup procedure. More particularly, FIG. 5 illustrates a signal-flow diagram between an eNB 105 and an MME 130. At step 502, eNB 105 sends an S1 Setup Request message to MME 130. At step 504, MME 130 sends an S1 Setup Response message to eNB 105.

During the S1 setup procedure illustrated in FIG. 5, the endpoints (MME 130 and eNB 105) will erase all existing application level configuration data and replace it by the configuration data received in the procedure. This procedure also re-initializes the E-UTRAN S1AP UE-related contexts (if any) and erases all related signaling connections for the endpoints. This is reflected in the state diagram of FIG. 4 (described above) as arrow 408 from S1AP DISCONNECTED state 404 to S1AP CONNECTED state 402 with action "S1 SETUP" (in case of no application level configuration data, or transport layer has been broken before), or arrow 410 from S1AP CONNECTED state 402 to S1AP CONNECTED state 402 with action "S1 SETUP" (in case of previous application level configuration data and transport layer is not broken).

Currently, there is no procedure to tear down a S1AP connection. In practice this means S1AP can be torn down only by breaking the signaling connection. This is reflected in the state diagram of FIG. 4 (described above) as arrow 406 from S1AP CONNECTED state 402 to S1AP DISCONNECTED state 404 with action "Broken lower layer."

SCTP is a reliable transport protocol operating on top of a connectionless packet network such as IP. This protocol is defined in IETF Request for Comments (RFC) 4960. SCTP offers the following services to its users: acknowledged error-free non-duplicated transfer of user data; data fragmentation to conform to discovered path Maximum Transmission Unit (MTU) size; sequenced delivery of user messages within multiple streams, with an option for order-of-arrival delivery of individual user messages; optional bundling of multiple user messages into a single SCTP packet; and network-level fault tolerance through support of multi-homing at either or both ends of an association. The design of SCTP also includes appropriate congestion avoidance behavior and resistance to flooding and masquerade attacks.

FIG. 6 illustrates an example SCTP association initialization procedure. More particularly, FIG. 6 is a signal-flow diagram of an initialization of SCTP association between endpoints (client 602 and server 604). At step 606, client 602 sends an initialization (INIT) message to server 604. At step 608, server 604 sends an initialization acknowledgement message (INIT-ACK) message to client 602. At step 610, client 602 sends a COOKIE-ECHO message to server 604. At step 612, server 604 sends a COOKIE-ACK message to client 602.

During the four-way handshake performed during initialization, the following SCTP specific information exchange between the endpoints (i.e., client 602 and server 604) is mandatory. The exchanged information includes an initiated tag, an advertised receiver window credit, a number of outbound streams, a number of inbound streams, an initial transmission sequence number (TSN); and a state cookie.

The Initiated Tag is used for packet validation of the SCTP session. A tag value (initial tag) is chosen by each end of the association during association initialization. This value will be assigned to field "Verification Tag" on all upcoming packets. Packets received without the expected Verification Tag value in the session are discarded, as a protection against blind masquerade attacks and against stale SCTP packets from previous sessions.

The Advertised Receiver Window Credit parameter represents the dedicated buffer space, in number of bytes, the endpoints have reserved in association with this window. During the life of the association, this buffer space should not be lessened (i.e., dedicated buffers taken away from this association).

The number of outbound streams defines the number of outbound streams the sender endpoint wishes to create in this association. The final number of outbound streams will be the minimum value of "Number of Outbound Streams" from the sender endpoint and the "Number of Inbound Streams" from the receiver endpoint.

The number of inbound streams defines the maximum number of streams the sender endpoint allows the peer end to create in this association. The final number of inbound streams will be the minimum value of "Number of Inbound Streams" from the sender endpoint and the "Number of Outbound Streams" from the receiver endpoint.

The Initial TSN is the initial TN of the sender of the association.

The state cookie is used for session authentication for protection against attack.

For multi-homing, in the current SCTP standard, multiple transport addresses on the end-points can be setup during the association initialization procedure. Modification of addresses after SCTP establishment can be done with an INIT message and a new address list parameter, the receiving endpoint responds with an ABORT message with cause of error "restart of an association with new addresses." The signal flow for address changes is described in more detail below in relation to FIG. 7.

FIG. 7 illustrates an example of address changes on an existing association. More particularly, FIG. 7 is a signal-flow diagram of an address change between endpoints (Endpoint A 702 and Endpoint Z 704). At step 706, Endpoint A 702 sends an INIT message to Endpoint Z 704. The INIT message includes a new address list parameter (reflected in the example of FIG. 7 as "address list=<differ from previous INIT/INIT-ACK>"). At step 708, Endpoint Z 704 sends an ABORT message to Endpoint A 702. The ABORT message includes a cause of error "restart of an association with new addresses" (reflected in the example of FIG. 7 as "Error Cause="Restart of an association with new addresses").

FIG. 8 illustrates a simplified SCTP association termination procedure. More particularly, FIG. 8 illustrates an example graceful termination of SCTP association between endpoints (Endpoint A 802 and Endpoint Z 804). In the example of FIG. 8, Endpoint A 802 wants to terminate the association. Endpoint A 802 will stop accepting new data from its upper layer, and wait (and retransmit outstanding data if needed) until all outstanding data has been acknowledged by Endpoint Z 804. At step 806, Endpoint A 802 transmits a SHUTDOWN chunk to Endpoint Z 804.

When Endpoint Z 804 receives SHUTDOWN chunk transmitted by Endpoint A 802, Endpoint Z 804 will stop accepting new data from its upper layer, and wait (and retransmit outstanding data if needed) until all outstanding data has been acknowledged by Endpoint A 802. At step 808, Endpoint Z 804 transmits a SHUTDOWN-ACK chunk to Endpoint A 802.

When Endpoint A 802 receives the SHUTDOWN-ACK chunk transmitted by Endpoint Z 804, Endpoint A 802 will remove all record of the association, and, at step 810, transmit a SHUTDOWN-COMPLETE chunk to Endpoint Z 804. When Endpoint Z 804 receives SHUTDOWN-COMPLETE chunk transmitted by Endpoint A 802, Endpoint Z 804 will remove all record of the association.

Network slicing relates to the creation of logically separated partitions of the network. Each network slice may, for example, address different business purposes. These "network slices" are logically separated to a degree that they can be regarded and managed as networks of their own.

The concept of network slicing applies to both LTE Evolution and new 5G RAT (also referred to as "NR" herein). A key driver for introducing network slicing is business expansion, such as improving the cellular operator's ability to serve other industries (e.g., by offering connectivity services with different network characteristics, such as performance, security, robustness, and complexity).

FIG. 9 illustrates an example of network slicing. An example of an architecture with network slicing provides a shared RAN infrastructure that will connect to several EPC instances (e.g., one EPC instance per network slice). As the EPC functions are virtualized, an operator may instantiate a new Core Network (CN) when it is determined that a new slice should be supported. In the example architecture of FIG. 9, slice 0, for example, may be a Mobile Broadband slice and Slice 1, may, for example, be a Machine Type Communication (MTC) network slice.

Because only one single SCTP association can be established between an eNB and MME, problems are encountered, for example, in connection with a hardware swap, or a single UE handling failure, which may cause a domino-effect crash of SCTP.

SUMMARY

To address the foregoing problems with existing solutions, disclosed is a method in a network node. The method comprises exchanging identifiers with a second network node, the exchanged identifiers for use in reestablishing a first S1 Application Protocol (S1AP) connection with the second network node, wherein at the time of the exchange the first S1AP connection is associated with a first Stream Control Transmission Protocol (SCTP) connection between the first network node and the second network node. The method comprises storing the identifiers in association with an S1AP context for the first S1AP connection. The method comprises sending, in response to a determination that the first S1AP connection with the second network node should be suspended, a request to suspend the first S1AP connection to the second network node. The method comprises reestablishing, after the first SCTP connection between the first network node and the second network node has been shut down and a second SCTP connection between the first network node and the second network node has been established, the first S1AP connection with the second network node using at least one of the stored identifiers, wherein the reestablished first S1AP connection is associated with the second SCTP connection between the first network node and the second network node.

In certain embodiments, the identifiers may be exchanged in connection with a setup procedure for establishing the first S1AP connection with the second network node. Exchanging identifiers with the second network node may comprise sending a first identifier associated with the first network node to the second network node in connection with the setup procedure for establishing the first S1AP connection with the second network node; and receiving, from the second network node, a second identifier associated with the second network node in connection with the setup procedure for establishing the S1AP connection with the second network node. The first network node may be an evolved NodeB (eNB), and the method may comprise sending, to the second network node, at least one of: a first Transport Network Layer (TNL) address for use by the second network node to trigger an SCTP association; and a second TNL address, the second TNL address for use by the second network node to trigger the reestablishment of the first S1AP connection in association with the second SCTP connection between the first network node and the second network node.

In certain embodiments, the first network node may be a Mobility Management Entity (MME), and the method may comprise receiving, from the second network node, at least one of: a first TNL address for use in triggering an SCTP association; and a second TNL address, the second TNL address for use in one or more of triggering the reestablishment of the first S1AP connection in association with the second SCTP connection between the first network node and the second network node and transmitting a single S1AP message transmission to the second network node. The method may comprise sending, to the second network node using the second TNL address, a request to reestablish the first S1AP connection in association with the second SCTP connection between the first network node and the second network node.

In certain embodiments, reestablishing the first S1AP connection with the second network node using at least one of the stored identifiers may comprise: sending, to the second network node, a request to reestablish the first S1AP connection with the second network node, the request comprising at least one of the exchanged identifiers, wherein the at least one of the exchanged identifiers is associated with the second network node. In certain embodiments, reestablishing the first S1AP connection with the second network node using at least one of the stored identifiers may comprise receiving, from the second network node, a request to reestablish the first S1AP connection with the second network node, the request comprising at least one of the exchanged identifiers, wherein the at least one of the exchanged identifiers is associated with the first network node; and mapping the received identifier associated with the first network node to the S1AP context for the first S1AP connection, wherein the mapping is based on the identifiers stored in association with the S1AP context for the first S1AP connection.

In certain embodiments, the method may comprise initiating, after receiving or sending an S1AP message over the first SCTP connection between the first network node and the second network node, an inactivity timer; determining that the first S1AP connection should be suspended if the inactivity timer expires, wherein the request to suspend the first S1AP connection is in response to the determination that the first S1AP connection should be suspended; and entering an S1AP suspended state. The request to suspend the first S1AP connection may comprise at least one of: a cause value indicating that the suspension is due to inactivity; and a TNL address, the TNL address for use by the second network node to trigger the reestablishment of the first S1AP connection in association with the second SCTP connection between the first network node and the second network node. In certain embodiments, the method may comprise initiating a suspension timer after sending the request to suspend the first S1AP connection to the second network node; and entering an S1AP disconnected state if the suspension timer expires. In certain embodiments, the method may comprise sending, while in the S1AP suspended state and before the first S1AP connection with the second network node has been reestablished, an S1AP message using an alternative TNL channel.

In certain embodiments, the method may comprise receiving, while in the S1AP suspended state and before the first S1AP connection with the second network node has been reestablished, an S1AP message using an alternative TNL channel; and determining whether the first S1AP connection with the second network node should be reestablished. In certain embodiments, the method may comprise detecting activity on the first S1AP connection; establishing the second SCTP connection between the first network node and the second network node; and sending, to the second network node, a request to reestablish the first S1AP connection with the second network node, the request including at least one of the stored identifiers, the at least one of the stored identifiers comprising an identifier associated with the second network node. The request to reestablish the first S1AP connection with the second network node may be sent using User Datagram Protocol (UDP).

In certain embodiments, the first network node may be an eNB; and the second network node may be an MME. In certain embodiments, the first network node may be an MME; and the second network node may be an eNB.

Also disclosed is a network node. The network node comprises processing circuitry. The processing circuitry is configured to exchange identifiers with a second network node, the exchanged identifiers for use in reestablishing a first S1 Application Protocol (S1AP) connection with the second network node, wherein at the time of the exchange the first S1AP connection is associated with a first Stream Control Transmission Protocol (SCTP) connection between the first network node and the second network node. The processing circuitry is configured to store the identifiers in association with an S1AP context for the first S1AP connection. The processing circuitry is configured to send, in response to a determination that the first S1AP connection with the second network node should be suspended, a request to suspend the first S1AP connection to the second network node. The processing circuitry is configured to reestablish, after the first SCTP connection between the first network node and the second network node has been shut down and a second SCTP connection between the first network node and the second network node has been established, the first S1AP connection with the second network node using at least one of the stored identifiers, wherein the reestablished first S1AP connection is associated with the second SCTP connection between the first network node and the second network node.

Certain embodiments of the present disclosure may provide one or more technical advantages. As one example, certain embodiments may advantageously eliminate the resetting of all UEs associated to S1AP in case of re-establishment of S1AP transport layer (i.e., SCTP) during, for example, hardware maintenance and/or expansion, as the SCTP association can now be disconnected and reconnected to S1AP without removal of existing S1AP configuration data. As another example, certain embodiments may advantageously increase the S1AP robustness in case of software failure (i.e., the number of affected UEs will be decreased when a SCTP instance fails). As still another example, certain embodiments may advantageously make it possible for the MME and eNB to decrease the demand of SCTP association instances when introducing network slices with low S1AP activity. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
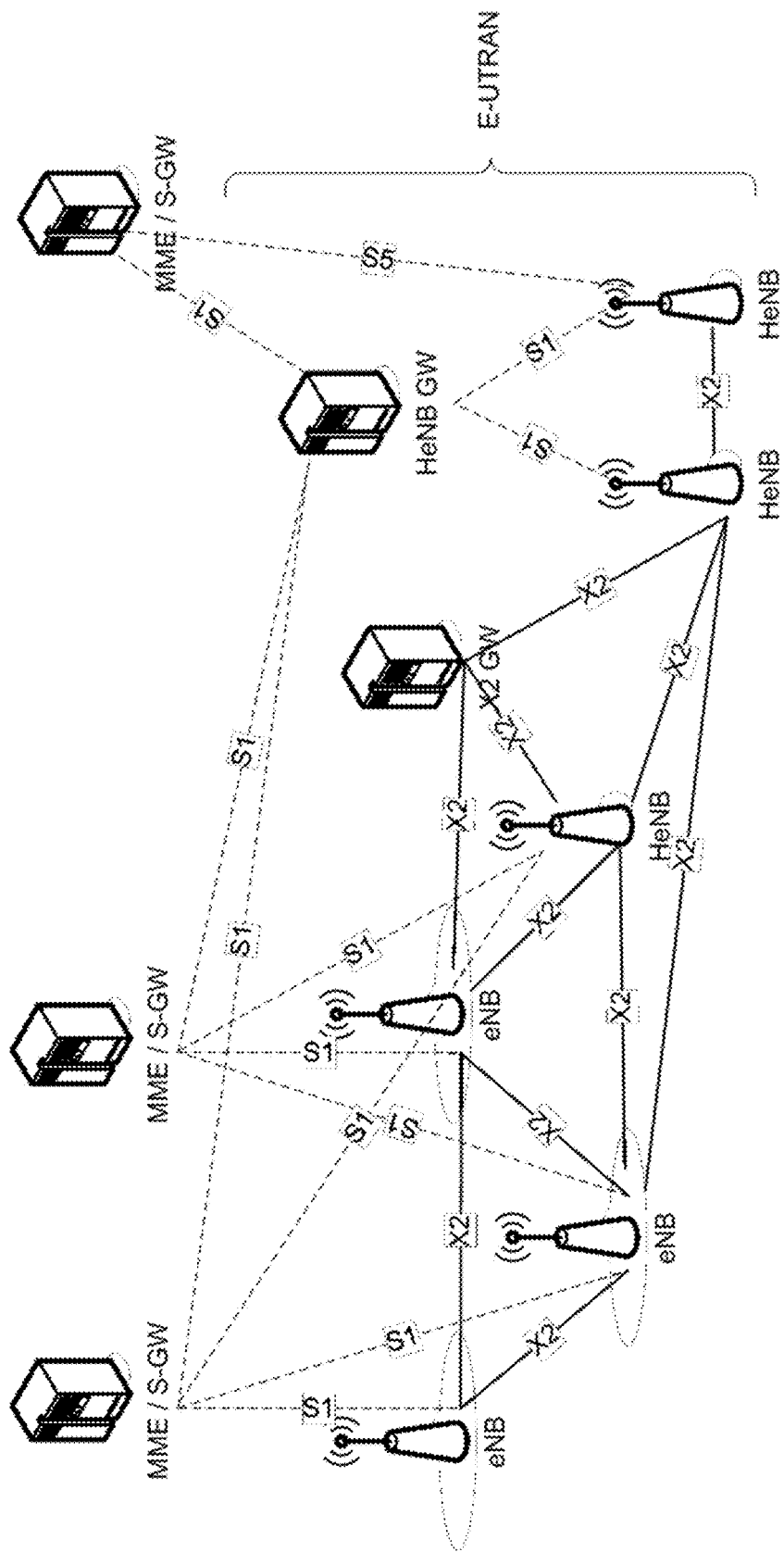
FIG. 1 illustrates an example LTE architecture.
Figure 2:
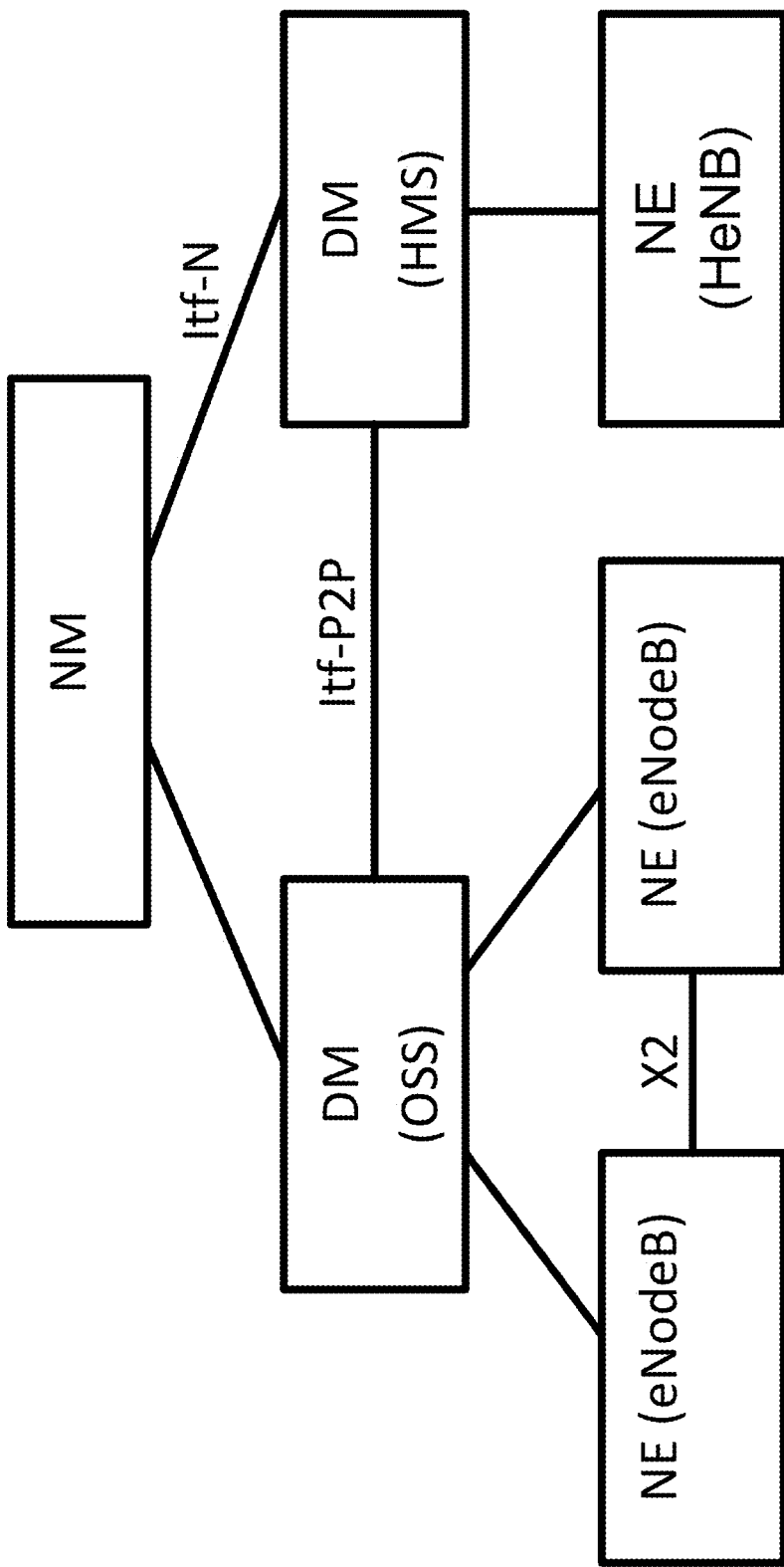
FIG. 2 illustrates an exemplary management system architecture.

As noted above, only one single SCTP association can be established between an eNB and MME. When only a single SCTP association can be established between an eNB and MME, problems may result. For example, a UE may lose its connectivity to the network in certain cases.

As another example, there can be no graceful redundancy switch of hardware in case of hardware swap. It is desirable that during hardware maintenance and/or expansion, the ongoing traffic in the network should be maintained without disturbance (i.e., packet loss). However, with the current limitations of the S1AP/SCTP relationship, and the current S1AP protocol, it is not possible to swap the hardware where the SCTP/S1AP software is located without disconnecting all the UEs connected to the S1AP connection. Unfortunately, multi-homing is not a solution as it does not solve the problem if it is the hardware where the SCTP process instance is located that needs to be swapped.

Another example is the problem of single UE handling failure causing a domino crash of SCTP. During SCTP association initialization, a common receiving buffer is assigned (reflected by parameter Advertised Receiver Window Credit described above). This receiving buffer will be the shared resource between the SCTP user application (i.e., S1AP) and SCTP transport service.

In S1AP, it is divided into Non UE-associated service and UE-associated service. One implementation can be for Non UE-associated service; it will be handled by one or several dedicated processes. For UE-associated service, it will be handled by multiple processes, where each process will handle one individual UE.

As the receiving buffer is the shared resource between SCTP transport service and S1AP service, a communication crash between an MME and an eNB will occur as soon as a crash occurs on one single involving process in the SCTP user application or SCTP transport service (e.g., one of the UE handling processes). Unfortunately, introduction of streams within an SCTP instance will not solve this problem as the receiving buffer is shared among the streams. This lack of robustness is especially serious, for example, when the eNB has a big configuration that contains a lot of connecting UEs.

As another example, problems may occur when introducing new network slice types that only serve a limited set of users but require full coverage. These kinds of network slices may have a very low traffic intensity, and thereby low activity over S1AP. However, with the current assumption on S1AP and SCTP, it is required that the MMEs of this slice are connected to all eNBs, which prevents a lightweight design of the MMEs of the network slice as the number of SCTP association instances is scaled with the number of eNBs in the RAN that the slice MME is connected to, and not with the S1AP activity towards the RAN.

The present disclosure contemplates various embodiments that may address these and other deficiencies associated with existing approaches. In some cases, this is achieved by decoupling the strict dependency between S1AP and SCTP by introducing procedures whereby SCTP can be disconnected and reconnected to S1AP, without affecting the UE/MME states connected to the S1AP. In certain embodiments, the current S1AP interface is modified to accomplish the decoupling. Although certain example embodiments may be described herein in terms of the S1AP interface, the various embodiments described herein are applicable to any suitable interface. For example, the various embodiments described herein may be applied to an X2AP interface.

According to one example embodiment, a method in a first network node is disclosed. In certain embodiments, the first network node may be an eNB. In certain embodiments, the first network node may be an MME. The first network node exchanges identifiers with a second network node. The exchanged identifiers are used to reestablish a first S1AP connection with the second network node. At the time of the exchange, the first S1AP connection may be associated with a first SCTP connection between the first network node and the second network node. The first network node stores the identifiers in association with an S1AP context for the first S1AP connection. The first network node sends, in response to a determination that the first S1AP connection with the second network node should be suspended, a request to suspend the first S1AP connection to the second network node. The first network node reestablishes, after the first SCTP connection between the first network node and the second network node has been shut down and a second SCTP connection between the first network node and the second network node has been established, the first S1AP connection with the second network node using at least one of the stored identifiers. The reestablished first S1AP connection is associated with the second SCTP connection between the first network node and the second network node.

Certain embodiments of the present disclosure may provide one or more technical advantages. As one example, certain embodiments may advantageously eliminate the resetting of all UEs associated to S1AP in case of re-establishment of S1AP transport layer (i.e., SCTP) during, for example, hardware maintenance and/or expansion, as the SCTP association can now be disconnected and reconnected to S1AP without removal of existing S1 AP configuration data. As another example, certain embodiments may advantageously increase the S1 AP robustness in case of software failure (i.e., the number of affected UEs will be decreased when a SCTP instance fails). As still another example, certain embodiments may advantageously make it possible for the MME and eNB to decrease the demand of SCTP association instances when introducing network slices with low S1 AP activity. Other advantages may be readily apparent to one having skill in the art. Certain embodiments may have none, some, or all of the recited advantages.

Figure 10:
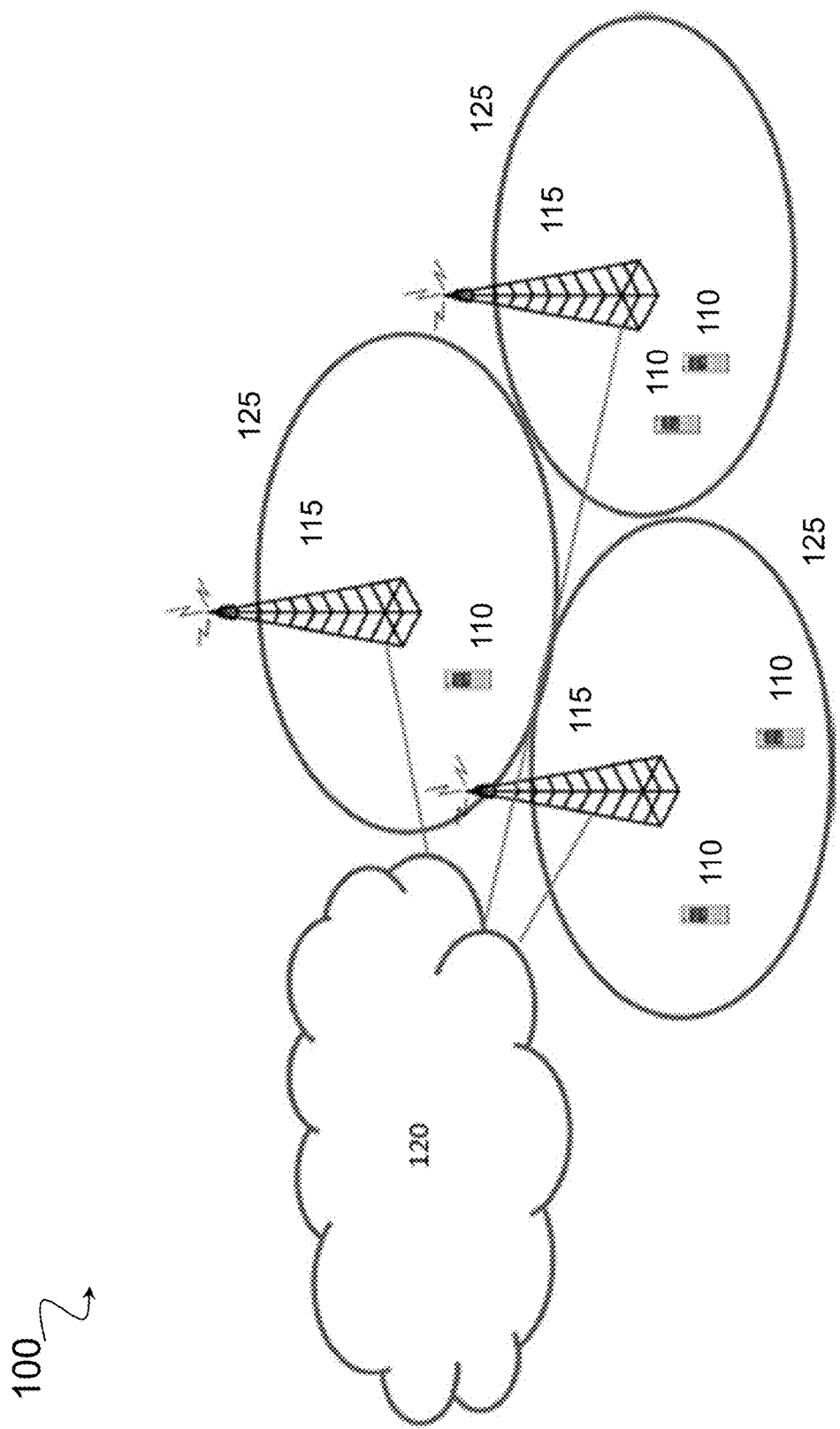
FIG. 10 is a block diagram illustrating an embodiment of a network, in accordance with certain embodiments.

FIG. 10 is a block diagram illustrating an embodiment of a network 100, in accordance with certain embodiments. Network 100 includes one or more UE(s) 110 (which may be interchangeably referred to as wireless devices 110) and one or more network node(s) 115. UEs 110 may communicate with network nodes 115 (e.g. eNB or gNB) over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, multi-standard radio (MSR) radio node such as MSR BS, eNB, gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME (e.g., MME 130 described above), etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel. Similarly, certain embodiments may be described in terms of a first network node 115 and a second network node 115. The present disclosure contemplates that these network nodes may be any suitable network node. For example, in certain embodiments first network node 115 may be an eNB and second network node 115 may be an MME. As another example, in certain embodiments first network node 115 may be an MME and second network node 115 may be an eNB.

Example embodiments of UE 110, network nodes 115, and other network nodes (such as radio network controller or core network node (e.g., MME 130)) are described in more detail below with respect to FIGS. 22-26.

Although FIG. 10 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any RAT or multi-RAT systems in which a UE receives and/or transmits signals (e.g., data). For example, the various embodiments described herein may be applicable to LTE, LTE-Advanced, 5G, NR, UMTS, HSPA, GSM, cdma2000, WCDMA, WiMax, UMB, WiFi, another suitable radio access technology, or any suitable combination of one or more RATs. Although certain embodiments may be described in the context of wireless transmissions in the downlink, the present disclosure contemplates that the various embodiments are equally applicable in the uplink.

As described above, the present disclosure contemplates various embodiments that may address deficiencies associated with existing approaches. In certain embodiments, for example, the strict dependency between S1AP and SCTP is decoupled by introducing procedures where SCTP can be disconnected and reconnected to S1 AP, without affecting the UE/MME states connected to the S1AP. In certain embodiments, the current S1AP interface is modified to accomplish the decoupling.

In order to decouple the strict dependency between S1AP and SCTP, there is a need for identification and mapping of S1AP context between the endpoints after the underlying transport network layer has been being re-established. In certain embodiments, this is achieved through an exchange of identifiers between a first network node 115 and a second network node 115. In some cases, first network node 115 may be an eNB, and second network node 115 may be an MME. In some cases, first network node 115 may be an MME, and second network node 115 may be an eNB. In certain embodiments, first network node 115 exchanges identifiers with second network node 115. The exchanged identifiers can be used in reestablishing a first S1AP connection with second network node 115. At the time of the exchange, the first S1AP connection may be associated with a first SCTP connection between first network node 115 and second network node 115. In certain embodiments, the identifiers may be exchanged in connection with a setup procedure for establishing the first S1AP connection with the second network node. The first network node stores the identifiers in association with an S1AP context for the first S1AP connection.

Figure 5:
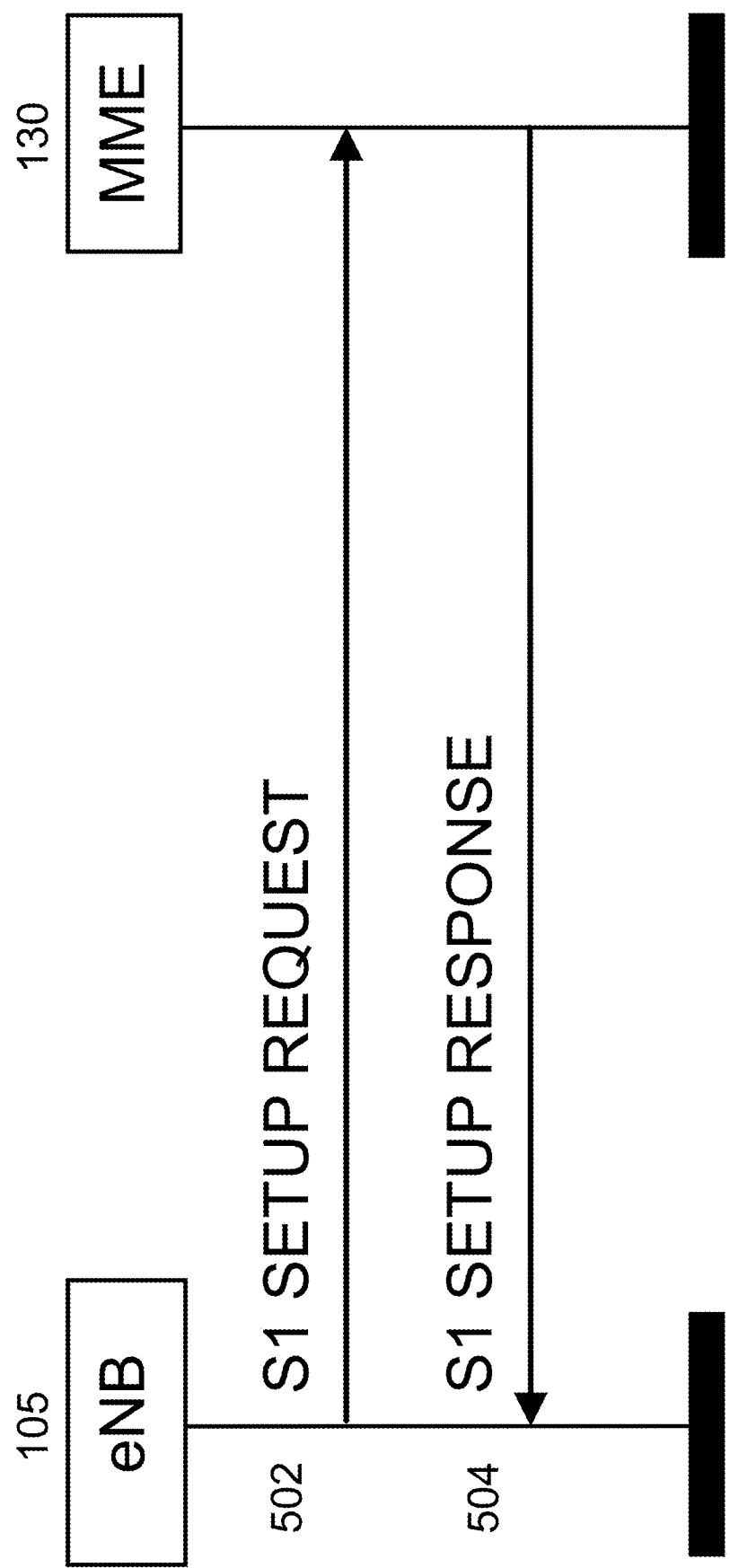
FIG. 5 illustrates an example of a successful S1 setup procedure.
Figure 6:
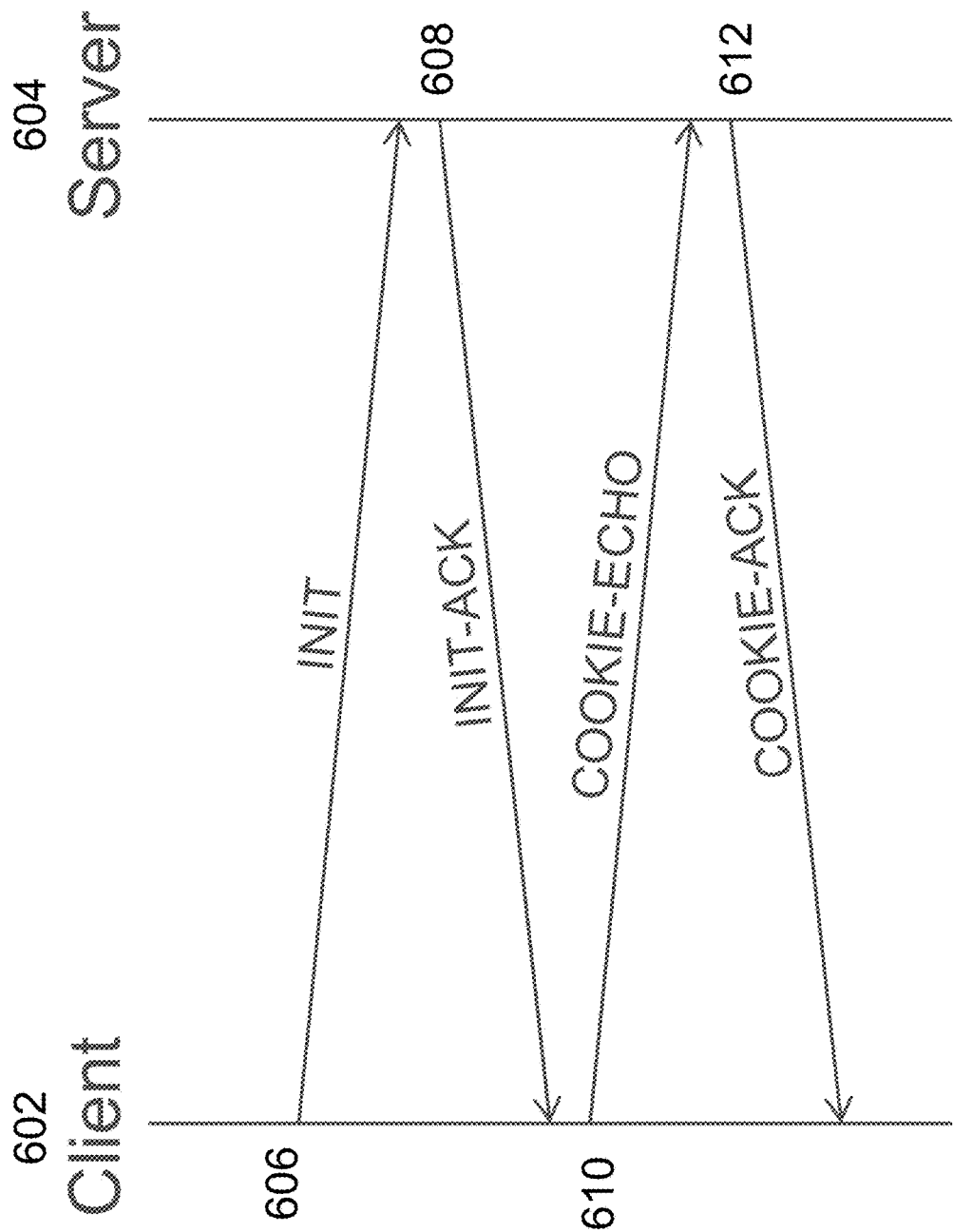
FIG. 6 illustrates an example SCTP association initialization procedure.
Figure 7:
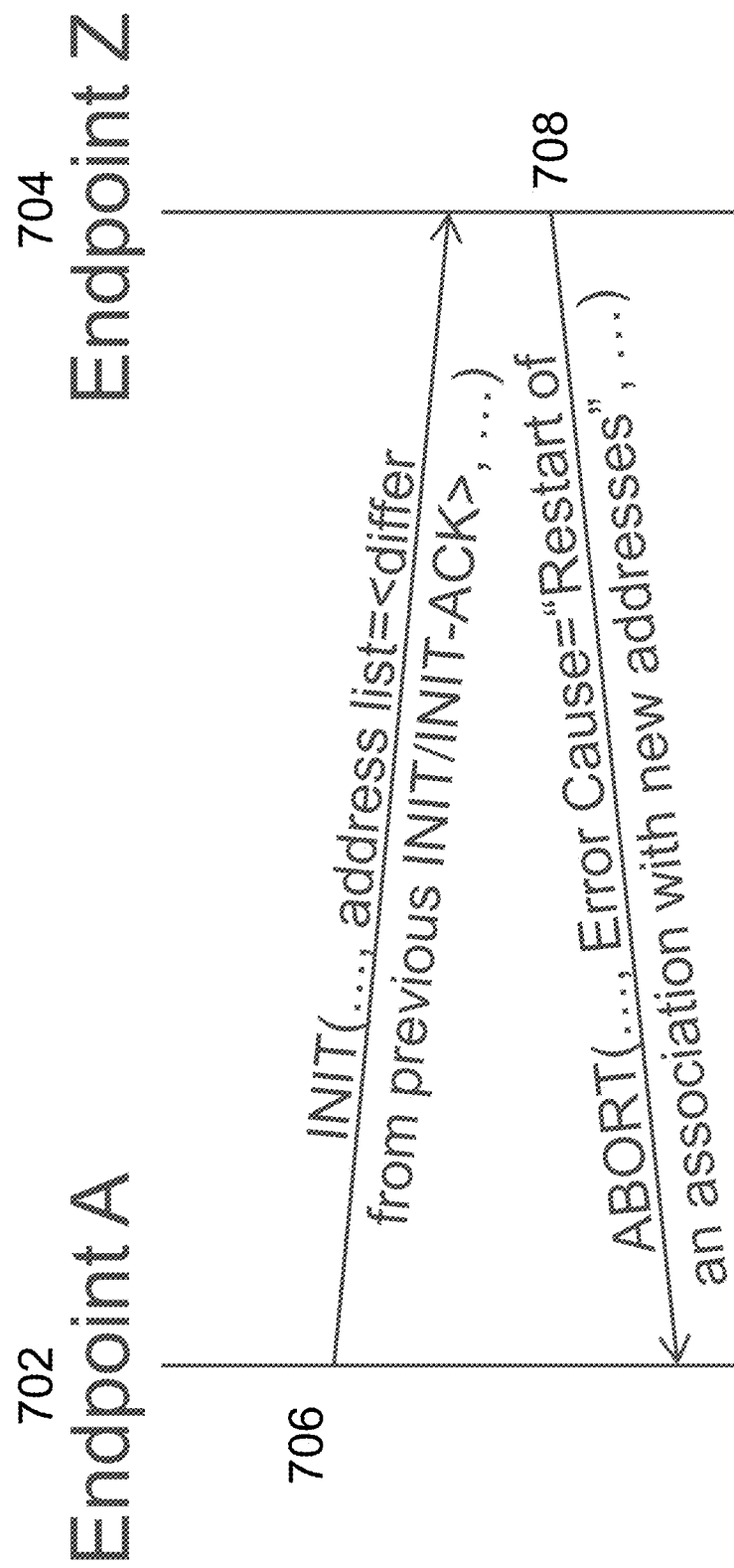
FIG. 7 illustrates an example of address changes on an existing association.
Figure 8:
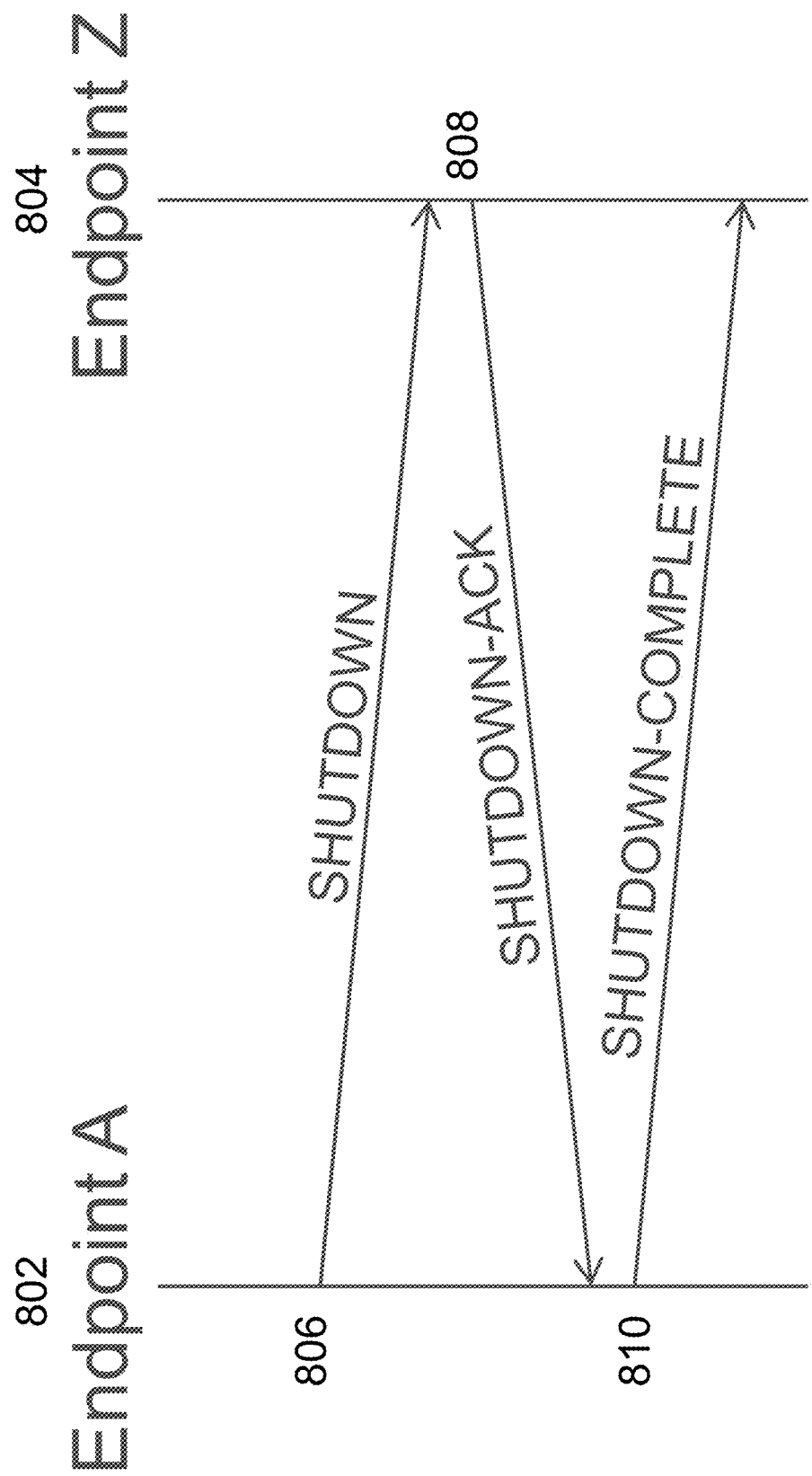
FIG. 8 illustrates a simplified SCTP association termination procedure.

For example, first network node 115 and second network node 115 may exchange identifiers during the S1 setup procedure (e.g., the example setup procedure described above in relation to FIG. 5). In such a scenario, for example, in the S1 SETUP REQUEST, first network node 115 (e.g., an eNB) will provide a (for eNB) unique identifier "eNB S1AP Configuration ID" to second network node 115 (e.g., an MME). In the S1 SETUP RESPONSE, second network node 115 (e.g., MME) will provide a unique (for MME) identifier "MME S1AP Configuration ID" to first network node 115 (e.g., eNB). These identities will be stored in S1AP context in both sides. By these identifiers, both endpoints (i.e., first network node 115 and second network node 115) can then point out the S1 AP context on the opposite side during S1AP re-establishment after suspension. An example of these additional parameters, with MME S1AP Configuration ID and eNB S1AP Configuration ID value range between 1 and $2^{32}-1$, can be found in Tables 1 and 2 below.

TABLE 1

S1 SETUP REQUEST with eNB S1AP Configuration ID

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString (SIZE(1 . . . 150, . . . )) | | YES | ignore |
| Supported TAs | | 1 . . . <maxnoofTACs> | | Supported TAs in the eNB. | GLOBAL | reject |
| >TAC | M | | 9.2.3.7 | Broadcast TAC. | — | |
| >Broadcast PLMNs | | 1 . . . <maxnoofBPLMNs> | | Broadcast PLMNs. | — | |
| >>PLMN Identity | M | | 9.2.3.8 | | | |
| Default Paging DRX | M | | 9.2.1.16 | | YES | ignore |
| CSG Id List | | 0 . . . 1 | | | GLOBAL | reject |
| >CSG Id | | 1 . . . <maxnoofCSGIds> | 9.2.1.62 | | | |
| eNB S1AP Configuration ID | O | 1 . . . $2^{32} - 1$ | | eNB S1AP Configuration ID for re-establishment | | |

TABLE 2

S1 SETUP RESPONSE with MME S1AP Configuration ID

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString(SIZE (1 . . . 150, . . . )) | | YES | ignore |
| Served GUMMEIs | | 1 . . . <maxnoofRATs> | | The LTE related pool configuration is included on the first place in the list. | GLOBAL | reject |
| >Served PLMNs | | 1 . . . <maxnoofPLMNsPerMME> | | | — | |
| >>PLMN Identity | M | | 9.2.3.8 | | — | |
| >Served GroupIDs | | 1 . . . <maxnoofGroupIDs> | | | — | |
| >>MME Group ID | M | | OCTET STRING (SIZE(2)) | | — | |
| >Served MMECs | | 1 . . . <maxnoofMMECs> | | | — | |
| >>MME Code | M | | 9.2.3.12 | | — | |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | Ignore |
| MME S1AP Configuration ID | O | 1 . . . $2^{32} - 1$ | | MME S1AP Configuration ID for re-establishment | | |

In certain embodiments, for backward compatibility, first network node 115 (e.g., eNB) may omit the eNB S1AP Configuration ID in the S1 SETUP REQUEST signal if it has no suspension and re-establishment capability. Similarly, in some cases second network node 115 (e.g., MME) can ignore the eNB S1AP Configuration ID if it is a legacy node or it has no suspension and re-establishment capability, and second network node 115 (e.g., MME) can return the S1 SETUP RESPONSE without the MME S1AP Configuration ID to inform first network node 115 (e.g., eNB) its lack of capability. Although the above examples have been described in terms of first network node 115 as an eNB and second network node 115 as an MME, the present disclosure contemplates that the various embodiments described herein are applicable to scenarios in which first network node 115 is an MME and second network node 115 is an eNB. In such a scenario, analogous operations would occur (i.e., first network node 115 (e.g., MME) would send in the S1 SETUP REQUEST a unique (for MME) identifier "MME S1AP Configuration ID" to second network node 115 (e.g., eNB), and in the S1 SETUP RESPONSE, second network node 115 (e.g., eNB) will provide a (for eNB) unique identifier "eNB S1AP Configuration ID" to first network node 115 (e.g., MME)).

Figure 3:
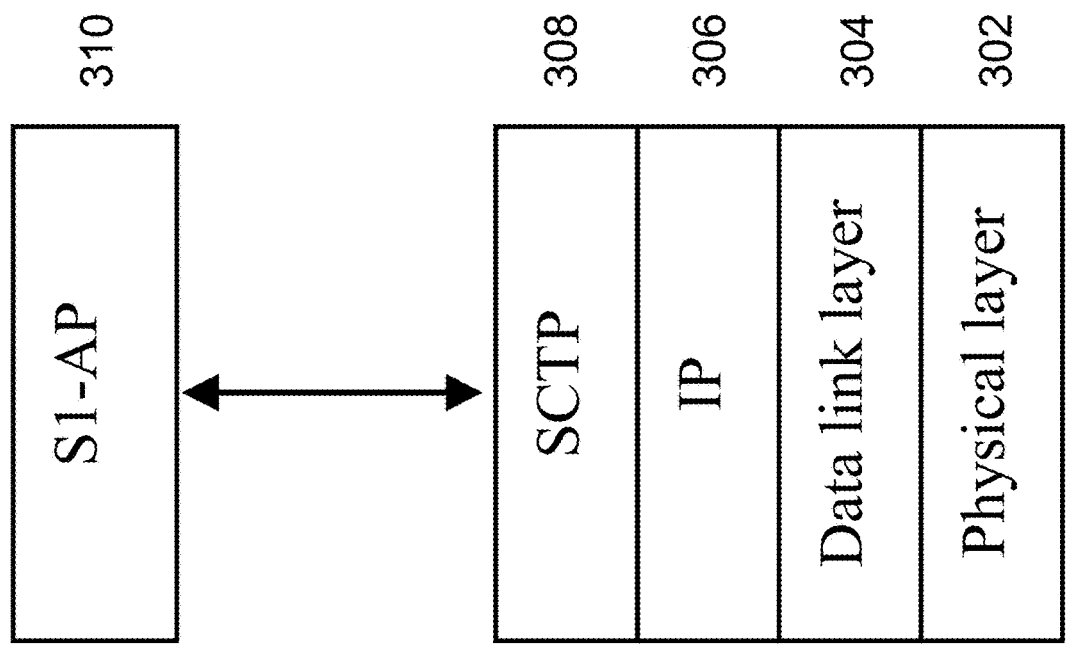
FIG. 3 illustrates an exemplary control plane stack.
Figure 4:
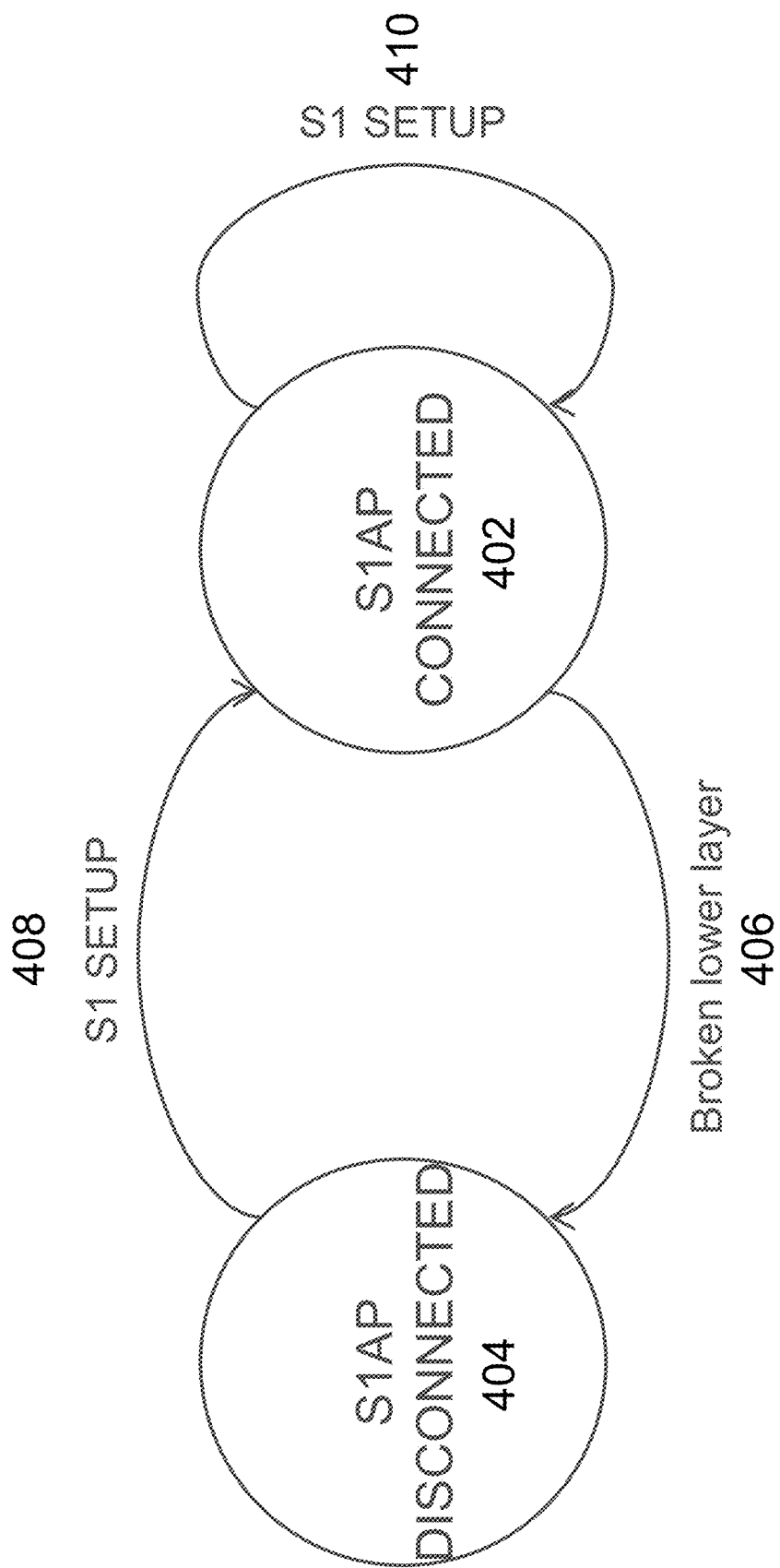
FIG. 4 illustrates a state transition diagram of S1AP.
Figure 11:
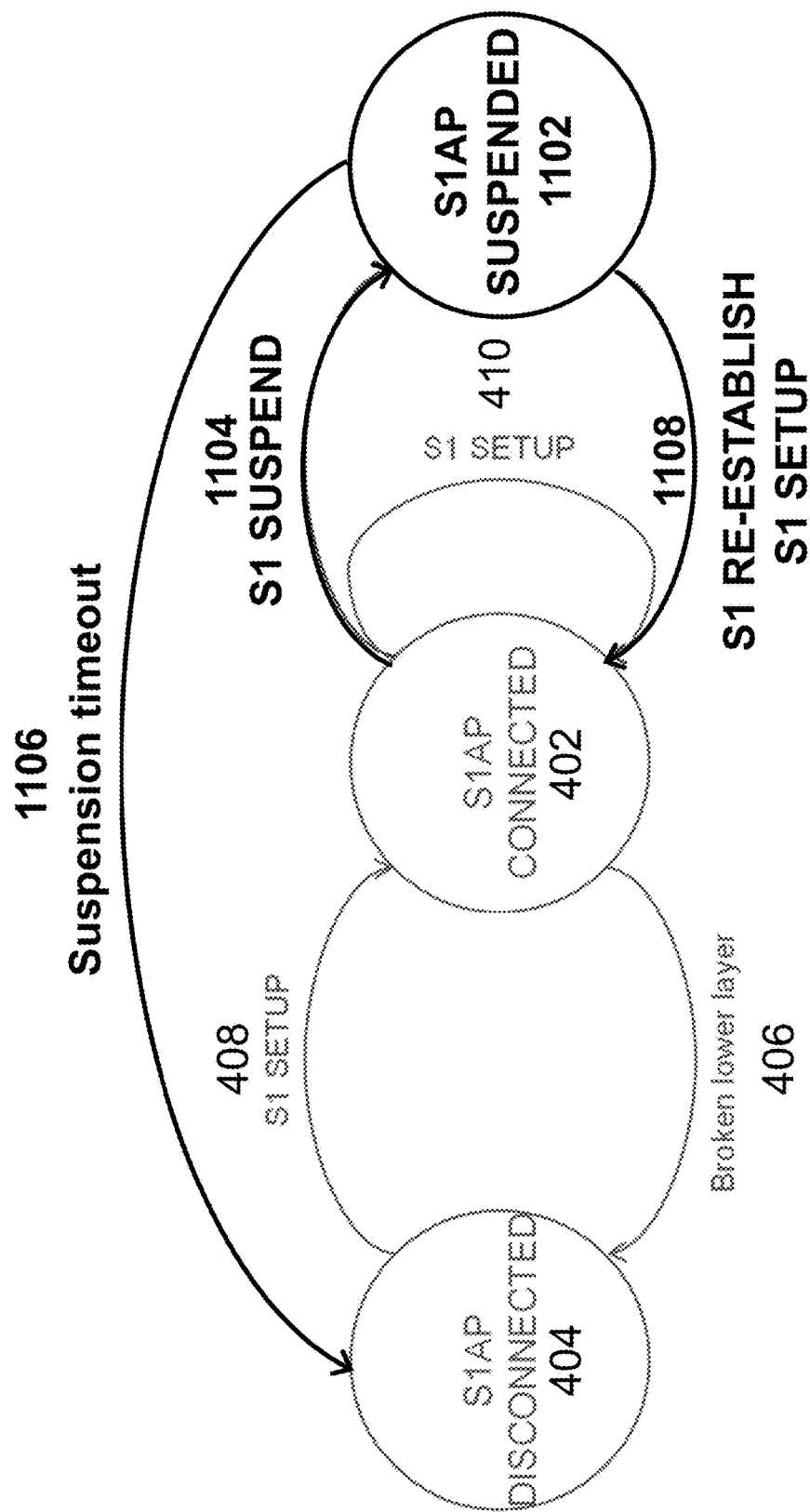
FIG. 11 illustrates an example S1 AP state diagram with a new state, S1 AP SUSPENDED, in accordance with certain embodiments.

FIG. 11 illustrates an example S1AP state diagram with a new state, S1AP SUSPENDED 1102, in accordance with certain embodiments. The example state diagram illustrated in the example of FIG. 11 is similar to the state diagram described above in relation to FIG. 4, except that it includes a new state, S1AP SUSPENDED 1102. In the example of FIG. 11, the two states described above in relation to FIG. 4 are reflected, namely S1AP CONNECTED state 402 and S1AP DISCONNECTED state 404. As described above, in case the SCTP layer (e.g., SCTP layer 308 described above in relation to FIG. 3) notifies the S1AP layer (e.g., S1AP layer 310 described above in relation to FIG. 3) that the signaling connection broke, the entire S1AP will then be reset on both endpoints. In other words, the MME locally changes the state of the UEs that used this signaling connection to the ECM-IDLE state, and the eNB releases the RRC connection with those UEs. This is reflected in the state diagram as arrow 406 from S1AP CONNECTED state 402 to S1AP DISCONNECTED state 404 with action "Broken lower layer."

As shown in the example of FIG. 11, transitions from S1AP DISCONNECTED state 404 to S1AP CONNECTED state may be achieved via an S1 setup procedure, reflected in the state diagram as arrow 408 from S1AP DISCONNECTED state 408 to S1AP CONNECTED state 402 with action "S1 Setup." Similarly, the S1 Setup procedure may take place within S1AP CONNECTED state 402, reflected in the state diagram as arrow 410 from S1AP CONNECTED state 402 to S1AP CONNECTED state 402 with action "S1 Setup."

In addition, in the example of FIG. 11 a new state, S1AP SUSPENDED 1102, is added in addition to S1AP CONNECTED state 402 and S1AP DISCONNECTED state 404. S1AP SUSPENDED state 1102 can be entered from S1AP CONNECTED state 402 after an S1 SUSPENSION procedure is executed, reflected in the state diagram as arrow 1104 from S1AP CONNECTED state 402 to S1AP SUSPENDED state 1102 with action "S1 Suspend." From S1AP SUSPENDED state 1102, S1AP DISCONNECTED state 404 can be entered if suspension timer expires, reflected in the state diagram as arrow 1106 from S1AP SUSPENDED state 1102 to S1AP DISCONNECTED state 404 with action "Suspension timeout." In addition, from S1AP SUSPENDED state 1102, S1AP CONNECTED state 402 can be entered after an S1 RE-ESTABLISHMENT procedure (with S1AP context preserved) or S1 SETUP procedure (with S1AP context reset) is executed, reflected in the state diagram as arrow 1108 from S1AP SUSPENDED state 1102 to S1AP CONNECTED state 402 with action "S1 Re-establish" or "S1 Setup."

Returning to FIG. 10, as part of the suspension and re-establishment of S1AP-SCTP association procedures described herein, at least four new S1AP messages are created for suspension and re-establishment of the S1AP-SCTP association. First, an S1 SUSPEND REQUIRED message is introduced. The S1 SUSPEND REQUIRED message is originated from, for example, second network node 115 (e.g., MME in certain embodiments), and can be used to start up the suspension and re-establishment procedure if it is originated from the MME. Second, an S1 SUSPEND message is introduced. The S1 SUSPEND signal is originated from, for example, first network node 115 (e.g., eNB in certain embodiments), and can be used to start up suspension and establishment procedure if it is originated from the eNB, or as a response message to the S1 SUSPEND REQUIRED message from the MME. Third, an S1 RE-ESTABLISH REQUEST message is introduced. The S1 RE-ESTABLISH REQUEST message is originated from first network node 115 (e.g., eNB) and can be used for re-establishing S1AP towards second network node 115 (e.g., MME). The S1 RE-ESTABLISH REQUEST message includes the parameter MME S1AP Config ID for identifying the existing S1AP context on the MME for mapping the new transport layer. Fourth, an S1 RE-ESTABLISH CONFIRM message is introduced. The S1 RE-ESTABLISH CONFIRM message is originated from second network node 115 (e.g., MME), and is used for re-establishing S1AP towards first network node 115 (e.g., eNB). The S1 RE-ESTABLISH CONFIRM message includes the parameter eNB S1AP Config ID for identifying the existing S1AP context on the eNB for verifying the mapping of the new transport layer.

Figure 12:
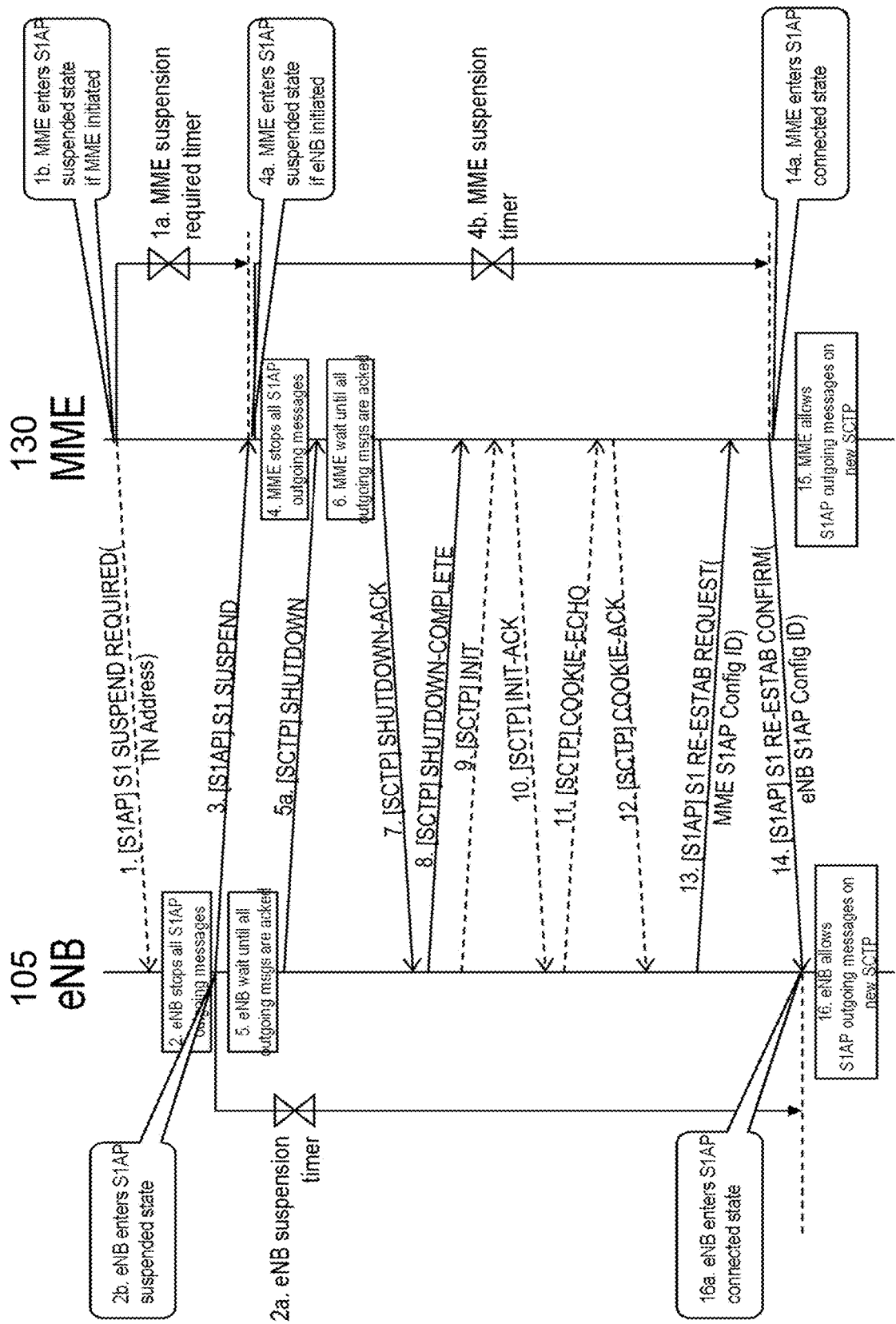
FIG. 12 illustrates a sequence-flow diagram for S1AP re-establishment, in accordance with certain embodiments.

FIG. 12 illustrates a sequence-flow diagram for S1AP re-establishment, in accordance with certain embodiments. More particularly, FIG. 12 illustrates an example sequence diagram of suspension and re-establishment of the S1AP-SCTP association. In the example of FIG. 12, the exchange of messages (which may be interchangeably referred to herein as signals) is between an eNB 105 and an MME 130. As a core network node, MME 130 is a type of network node 115 (as described above). To prevent confusion, the MME in the examples of FIGS. 12-20 will be referred to as MME 130. The present disclosure contemplates that in certain embodiments the various features of both network node 115 and core network node 130 described below in relation to FIGS. 23 and 24 may apply to MME 130.

In certain embodiments, if MME 130 wants to suspend and re-establish S1AP, at step 12-1 MME 130 will transmit an S1 SUSPEND REQUIRED message to eNB 105. The S1 SUSPEND REQUIRED message may include an optional parameter "TN address" if MME 130 wants eNB 105 to re-establish SCTP in a specific MME interface. After transmission, at step 12-1*a* MME 130 starts an MME suspension required timer. At step 12-1*b*, MME 130 enters S1AP SUSPENDED state (if MME initiated).

In certain embodiments, if eNB 105 wants to suspend and re-establish S1AP (or received an S1 SUSPEND REQUIRED message from MME 130 at step 12-1), at step 12-2 eNB 105 will stop all the S1AP outgoing messages by informing the higher layer. In certain embodiments, at step 12-2*a* eNB 105 starts an eNB suspension timer. At step 12-2*b*, eNB 105 enters S1AP SUSPENDED state.

At step 12-3, eNB 105 transmits an S1 SUSPEND message to MME 130. As described above, the S1 SUSPEND message can be used to start up the suspension and establishment procedure if it is originated from eNB 105 (or as a response message to an S1 SUSPEND REQUIRED message from MME 130). After MME 130 receives the S1 SUSPEND message, at step 12-4 MME 130 will stop all S1AP outgoing messages by informing the higher layer, and at step 12-4*a* MME 130 enters S1AP SUSPENDED state (if it has not already done so at step 12-1*b* described above). MME 130 stops the MME suspension required timer if the timer is started (e.g., at step 12-1*a* as described above), and at step 12-4*b* starts an MME suspension timer.

Steps 12-5 through 12-8 illustrate the SCTP SHUTDOWN procedure according to the current standard, which provides graceful closure of the SCTP association, and guarantees all outstanding data is delivered. At step 12-5, after S1 SUSPEND REQUIRED is transmitted, eNB 105 will wait until all the data in its buffer has been transmitted and acknowledged by MME 130, and then at step 12-5*a* will transmit a SHUTDOWN message on the SCTP layer to MME 130. After the SHUTDOWN message has been received, at step 12-6 MME 130 will wait until all the data in its buffer has been transmitted and acknowledged by eNB 105. At step 12-7, MME 130 transmits a SHUTDOWN-ACK message on the SCTP layer. After the SHUTDOWN-ACK message is received, at step 12-8 eNB 105 transmits a SHUTDOWN-COMPLETE message on SCTP layer. At steps 12-9 through 12-12, a new SCTP association is setup between eNB 105 and MME 130 according to current standard. This procedure is independent from steps 12-2 through 12-8 above and can be done anytime, or after step 12-1 if MME specifies a certain interface for setup.

After the SHUTDOWN-ACK message has been received from the old SCTP association (at step 12-8) and the new SCTP association has been setup (at step 12-12), eNB 105 transmits an S1 RE-ESTABLISH REQUEST to MME 130 at step 12-13 through the new SCTP association. As described above, the S1 RE-ESTABLISHMENT REQUEST message may be originated from eNB 105 and is used for re-establishing S1AP towards MME 130. The S1 RE-ESTABLISH REQUEST message includes the parameter MME S1AP Config ID for identifying the existing S1AP context on the MME for mapping the new transport layer. Thus, in the example of FIG. 12, the S1 RE-ESTABLISH REQUEST message includes the parameter MME S1AP Config ID retrieved during the S1 SETUP procedure.

After the S1 RE-ESTABLISH REQUEST message has been received, MME 130 will use the MME S1AP Config ID to map the correct S1AP context to the new SCTP association, and at step 12-14 MME 130 transmits an S1 RE-ESTABLISH CONFIRM message to eNB 105 through the new SCTP association. As described above, the S1 RE-ESTABLISH CONFIRM message may be originated from MME 130 and can be used for re-establishing S1AP towards eNB 105. The S1 RE-ESTABLISH CONFIRM message contains the parameter eNB S1AP Config ID for identifying the existing S1AP context on the eNB for verifying the mapping of the new transport layer. Thus, in the example of FIG. 12, the S1 RE-ESTABLISH CONFIRM message includes the parameter eNB S1AP Config ID retrieved during the S1 SETUP procedure. In certain embodiments, MME 130 stops the MME suspension timer and at step 12-14*a* enters S1AP CONNECTED state.

At step 12-15, MME 130 informs the upper layer that the S1AP outgoing messages can be resumed. After the S1 RE-ESTABLISH CONFIRM message has been received, at step 12-16 eNB 105 informs the upper layer that the S1AP outgoing messages can be resumed. In certain embodiments, eNB 105 stops the eNB suspension timer, and at step 12-16*a* enters S1AP CONNECTED state.

Figure 9:
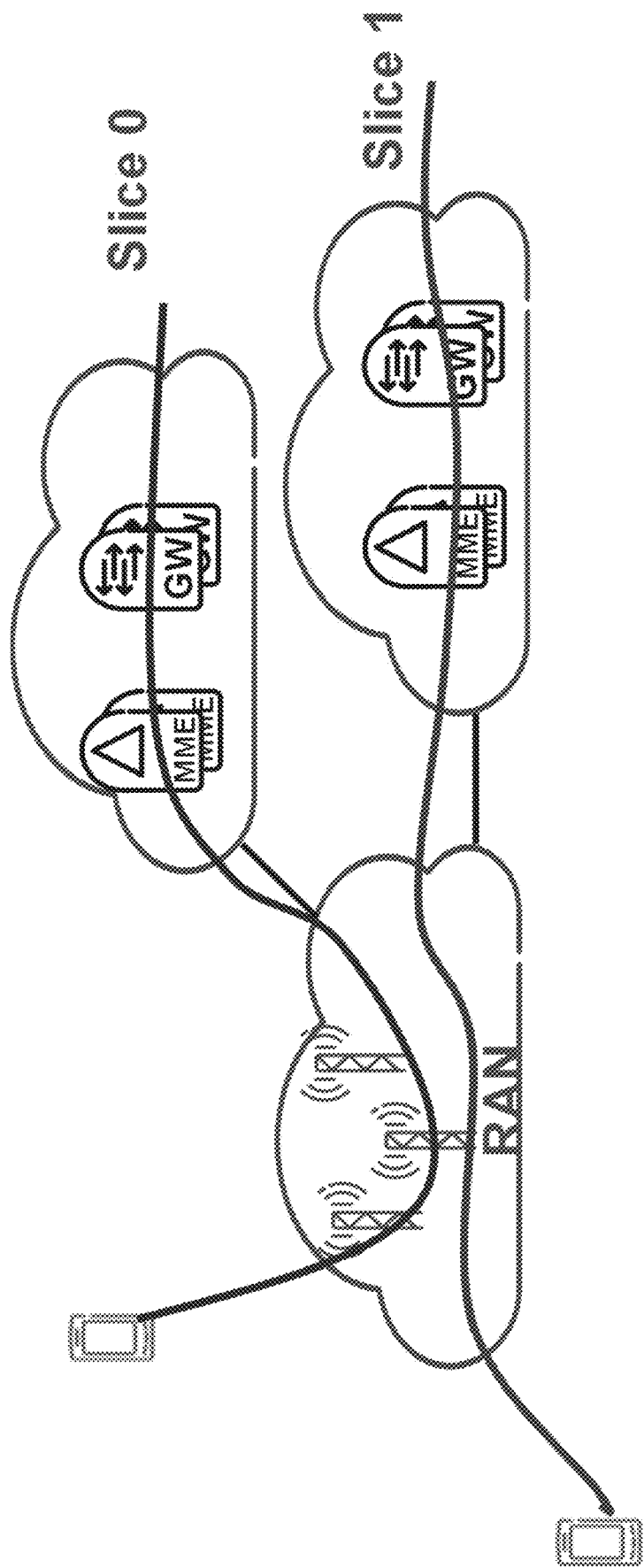
FIG. 9 illustrates an example of network slicing.

In the current S1AP, one working SCTP association must be mapped to one S1AP connection, and the SCTP association must be initiated by the eNB. As described above in relation to FIG. 9, network slicing may be used to create logically separated partitions of the network, for example to address different business purposes. These "network slices" are logically separated to a degree that they can be regarded and managed as networks of their own. Problems may occur, however, when introducing new network slice types that only serve a limited set of users but require full coverage. These kinds of network slices may have a very low traffic intensity, and thereby low activity over S1AP. However, with the current assumption on S1AP and SCTP, it is required that the MMEs of this slice are connected to all eNBs, which prevents a light weight design of the MMEs of the network slice as the number of SCTP association instances is scaled with the number of eNBs in the RAN that the slice MME is connected to, and not with the S1AP activity towards the RAN. Even when decoupling the SCTP and S1-AP association (which allows for temporarily suspending the SCTP connection) as described above, a problem still occurs in connection to SCTP suspension on S1AP. For example, in the current standard, the SCTP association must be setup by the eNB. However, resuming the S1AP connection can be triggered by the eNB and/or MME. Examples of S1AP signals that trigger resuming the S1AP connection from the MME side include: paging; handover request; and overload start.

The present disclosure contemplates various embodiments that may address these and other deficiencies associated with existing approaches. As described above, the strict dependency between S1AP and SCTP can be decoupled by introducing procedures where SCTP can be disconnected and reconnect to S1AP, without affecting the UE/MME states of UEs associated to an S1AP connection. However, decoupling the S1AP-SCTP dependency does not address cases of disconnecting/re-connecting the SCTP due to inactivity/activity on S1AP, and does not alone provide a solution for the MME to trigger the re-connection of the SCTP.

Certain embodiments may advantageously enable the MME to trigger re-connection of SCTP association and map the SCTP association to the existing S1AP connection. In some cases, this is achieved by allowing the MME to establish SCTP association towards the eNB, and by allowing the MME to trigger the eNB to establish SCTP association by sending a message through, for example, a User Datagram Protocol (UDP) port on eNB. Additionally, certain embodiments may advantageously introduce an alternative TNL channel mapped to current S1AP, such as UDP, for transmitting S1AP single messages when S1AP is in suspended state without re-establishing SCTP association. In some cases, changes in the current S1AP interface may be required. Although certain example embodiments may be described in relation to the S1AP interface, the present disclosure contemplates that the various embodiments described herein may be applied to other interfaces. For example, the various embodiments described herein may be applied to the X2 Application Protocol (X2AP) interface, or other 3GPP interfaces that use single SCTP as the TNL. These embodiments may advantageously make it possible for the MME and eNB to decrease the demand of SCTP association instances when introducing network slices with low S1AP activity.

As described above, there is a need for identification and mapping of S1AP context between the endpoints after the underlying TNL is re-established. One method (described above in relation to FIGS. 11 and 12) is exchanging additional identifiers during the S1 setup procedure. In the S1 SETUP REQUEST message, a first network node (e.g., an eNB) will provide a (for eNB) unique identifier eNB S1AP Configuration ID to a second network node (e.g., an MME), and in the S1 SETUP RESPONSE message, the second network node (e.g., MME) will provide a unique (for MME) identifier MME S1AP Configuration ID to the first network node (e.g., eNB). These identities will be stored in S1AP context in both sides. By these identifiers, both endpoints can then point out the S1AP context on the opposite side during S1AP re-establishment after suspension. This capability provides the basis for further embodiments described herein.

In certain embodiments, in order for the MME to trigger re-establishment of TNL, the eNB will provide a parameter "eNB TNL address." The eNB TNL address may include eNB address(es) for triggering SCTP association(s), for example in S1 SETUP REQUEST and eNB Configuration Update signals. Further, in order for the MME to trigger an eNB to re-establish SCTP association, and/or an alternative TNL channel for a single S1AP message transmission to the eNB, the eNB will provide a parameter "eNB TNL2 address." The eNB TNL2 address may include an eNB address for an alternative TNL channel, for example in the S1 SETUP REQUEST message and eNB Configuration Update message. In certain embodiments, the eNB TNL2 address can be used by the MME to send a message to the eNB that triggers the re-establishment of the SCTP association. In certain embodiments, the eNB TNL2 address can be used by the MME to send a single S1AP message to eNB.

In order for an eNB to create an alternative TNL channel for single S1AP message transmission, the MME will provide a parameter "MME TNL2 address." The MME TNL2 address may include an MME address for an alternative TNL channel, for example in the S1 SETUP CONFIRM message and/or MME Configuration Update message. In certain embodiments, a request to setup a new channel from the eNB will be sent to this address. Examples of these additional parameters, with MME S1AP Configuration ID and eNB S1AP Configuration ID value range between 1 and $2^{32}-1$, and with eNB TNL address, eNB TNL2 address and MME TNL2 address, are provided in Tables 3 and 4 below.

TABLE 3

S1 SETUP REQUEST with eNB S1AP Configuration ID and eNB TNL address

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString (SIZE(1 . . . 150, . . . )) | | YES | ignore |
| Supported TAs | | 1 . . . <maxnoofTACs> | | Supported TAs in the eNB. | GLOBAL | reject |
| >TAC | M | | 9.2.3.7 | Broadcast TAC. | — | |
| >Broadcast PLMNs | | 1 . . . <maxnoofBPLMNs> | | Broadcast PLMNs. | — | |
| >>PLMN Identity | M | | 9.2.3.8 | | | |
| Default Paging DRX | M | | 9.2.1.16 | | YES | ignore |
| CSG Id List | | 0 . . . 1 | | | GLOBAL | reject |
| >CSG Id | | 1 . . . <maxnoofCSGIds> | 9.2.1.62 | | | |
| eNB S1AP Configuration ID | O | 1 . . . $2^{32}-1$ | | eNB S1AP Configuration ID for re-establishment | | |
| eNB TNL address | O | IP address:portnr | | S1AP SCTP triggering address | | |
| eNB TNL2 address | O | IP address:portnr | | S1AP alternative TNL address for triggering SCTP re-estab. or single S1AP message transmission. | | |

TABLE 4

S1 SETUP RESPONSE with MME S1AP Configuration ID

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString (SIZE(1 . . . 150, . . . )) | | YES | ignore |
| Served GUMMEIs | | 1 . . . <maxnoofRATs> | | The LTE related pool configuration is included on the first place in the list. | GLOBAL | reject |
| >Served PLMNs | | 1 . . . <maxnoofPLMNsPerMME> | | | — | |

TABLE 4-continued

S1 SETUP RESPONSE with MME S1AP Configuration ID

| IE/Group Name | Presence | Range | IE type and reference | Semantics description | Criticality | Assigned Criticality |
|---|---|---|---|---|---|---|
| >>PLMN Identity | M | | 9.2.3.8 | | — | |
| >Served GroupIDs | | 1 ... <maxnoofGroupIDs> | | | — | |
| >>MME Group ID | M | | OCTET STRING (SIZE(2)) | | — | |
| >Served MMECs | | 1 ... <maxnoofMMECs> | | | — | |
| >>MME Code | M | | 9.2.3.12 | | — | |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | Ignore |
| MME S1AP Configuration ID | O | 1 ... 2$^{32}$ − 1 | | MME S1AP Configuration ID for re-establishment | | |
| MME TNL2 address | O | | IP address:portnr | S1AP alternative TNL address for single S1AP message transmission. | | |

In certain embodiments, for backward compatibility, the eNB can omit these additional parameters in the S1 SETUP REQUEST message if it lacks these new capabilities. In certain embodiments, the MME can ignore these additional parameters if it is a legacy node or it lacks these new capabilities. In such a scenario, the MME will return an S1 SETUP RESPONSE message without these additional parameters to inform the eNB that it lacks these capabilities. The requirement of presence of parameters for each capability is described in more detail below.

As described above in relation to FIG. 11, a new S1AP state diagram may include an additional state, S1AP SUSPENDED state. The S1AP SUSPENDED state can be entered from S1AP CONNECTED after the S1 SUSPENSION procedure is executed. From the S1AP SUSPENDED state, transition to S1AP DISCONNECTED state can occur if a suspension timer expires (if such a timer exists), or transition to S1AP CONNECTED state can occur after S1 RE-ESTABLISHMENT procedure (with S1AP context preserved) or S1 SETUP procedure (with S1AP context reset) is executed.

Figure 13:
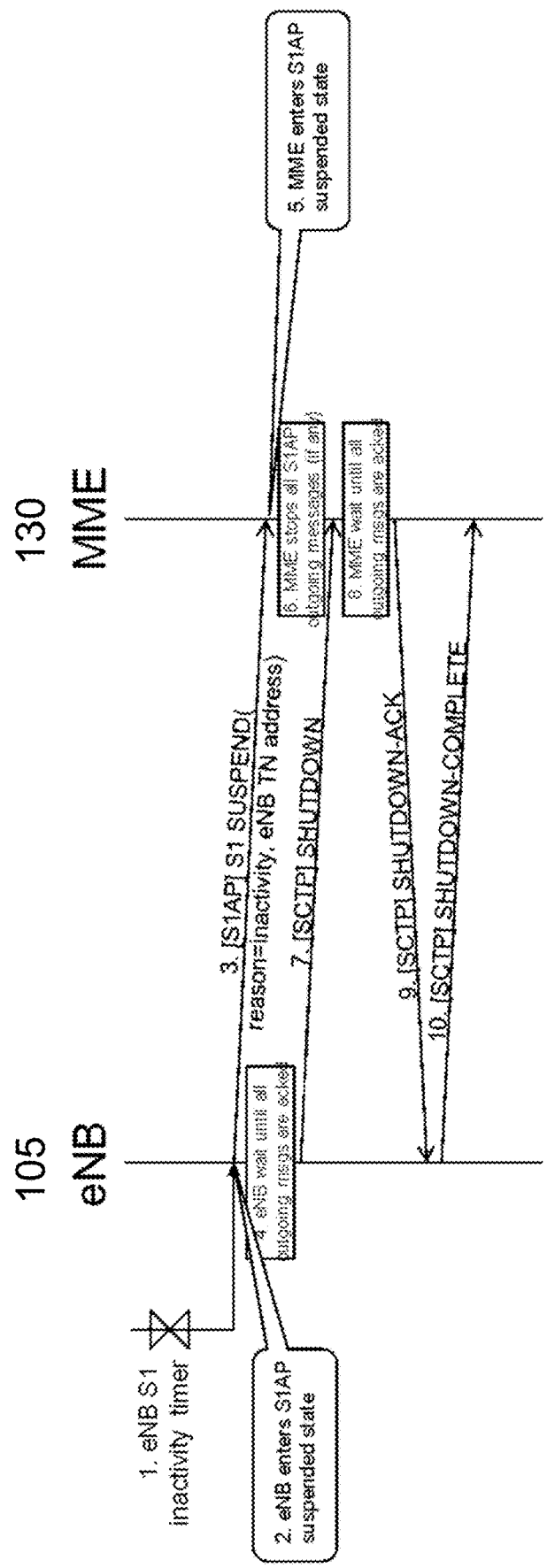
FIG. 13 illustrates an example of suspension of SCTP association due to inactivity that is initiated by an eNB, in accordance with certain embodiments.
Figure 14:
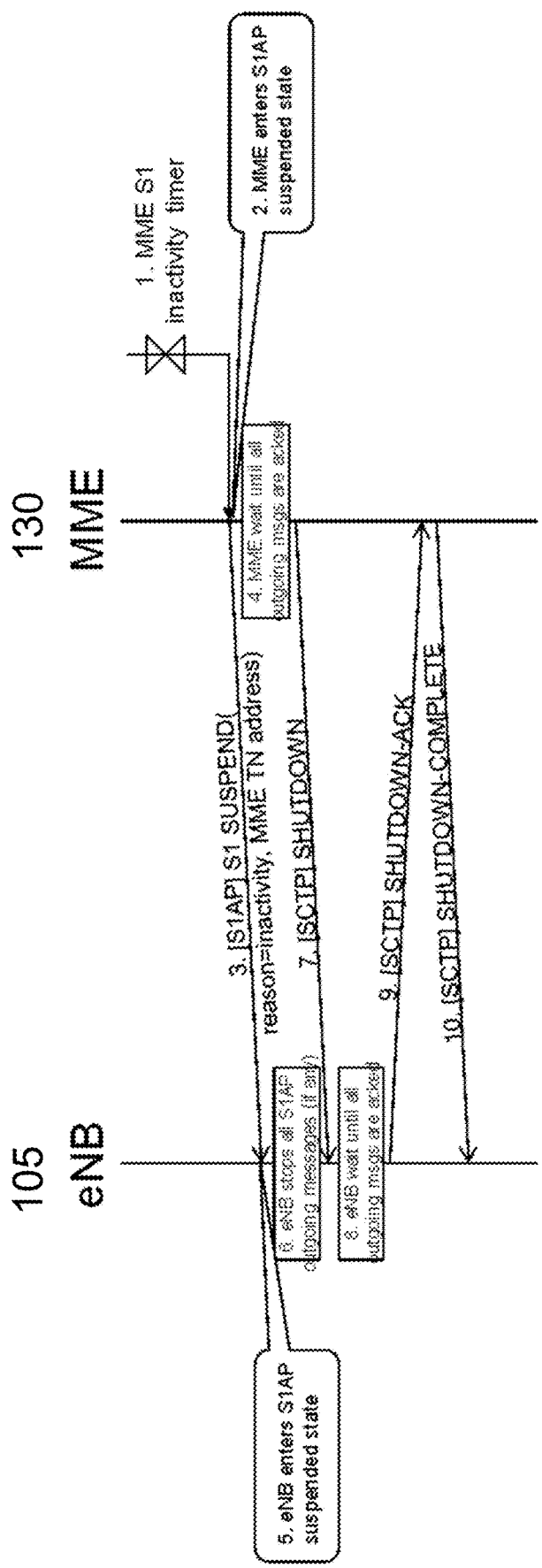
FIG. 14 illustrates an example of suspension of SCTP association due to inactivity that is initiated by an MME, in accordance with certain embodiments.

Suspension and re-establishment of the S1AP-SCTP association may occur in a variety of ways. As one example, suspension of the SCTP association may occur due to inactivity. FIGS. 13 and 14 (described in more detail below), illustrate examples of the sequence of suspension of SCTP association due to inactivity.

FIG. 13 illustrates an example of suspension of SCTP association due to inactivity that is initiated by an eNB, in accordance with certain embodiments. After receiving or sending an S1AP message over an SCTP association, at step 13-1 eNB 105 initiates an eNB S1 inactivity timer (e.g., starts or restarts the eNB S1 inactivity timer). Once timeout of the eNB S1 inactivity timer occurs, the SCTP suspension will be triggered.

Once timeout occurs on the eNB S1 inactivity timer, at step 13-2 eNB 105 sets its S1AP state to S1AP SUSPENDED state. Once timeout occurs on the eNB S1 inactivity timer, at step 13-3 eNB 105 transmits an S1AP signal S1 SUSPEND message, with a cause value=inactivity to MME 130. In some cases, an optional parameter eNB TN address can also be added. This parameter may override the earlier information indicating which Transport Network (TN) address should be used if MME 130 needs to resume the SCTP association due to S1AP activity.

After the S1 SUSPEND message has been sent, eNB 105 will start the SCTP shutdown procedure at step 13-4 by waiting for all buffered SCTP data to be transmitted and acknowledged according to the current standard. Once the S1 SUSPEND message is received, at step 13-5 MME 130 enters S1AP SUSPENDED state. If there is any ongoing S1AP message on MME 130, at step 13-6 it will be stopped and can be transmitted first after the suspension procedure is finished, and then the outgoing message will act as a trigger for SCTP re-establishment procedure. At steps 13-7 through 13-10, the SCTP SHUTDOWN procedure is performed according to the current standard, which provides graceful closure of the SCTP association, and guarantees all outstanding data is delivered.

FIG. 14 illustrates an example of suspension of SCTP association due to inactivity that is initiated by an MME, in accordance with certain embodiments. After receiving or sending an S1AP message over an SCTP association, at step 14-1 MME 130 initiates an MME S1 inactivity timer (e.g., starts or restarts the eNB S1 inactivity timer). Once timeout of the MME S1 inactivity timer occurs the SCTP suspension will be triggered.

Once timeout occurs on the MME S1 inactivity timer, at step 14-2 MME 130 enters S1AP SUSPENDED state. Once timeout occurs on MME S1 inactivity timer, at step 14-3

MME 130 transmits an S1AP signal S1 SUSPEND message, with a cause value=inactivity to eNB 105. In some cases, an optional parameter "MME TN address" can also be added. This parameter may override the earlier information indicating which TN address should be used if eNB 105 needs to resume the SCTP association due to S1AP activity.

After the S1 SUSPEND message has been sent, MME 130 will start the SCTP shutdown procedure at step 14-4 by waiting for all buffered SCTP data to be transmitted and acknowledged according to the current standard. Once the S1 SUSPEND message is received, at step 14-5 eNB 105 enters S1AP SUSPENDED state. If there is any ongoing S1AP message on eNB 105, at step 14-6 it will be stopped and can be transmitted first after the suspension procedure is finished, and then the outgoing message will act as a trigger for the SCTP re-establishment procedure. At steps 14-7 through 14-10, the SCTP SHUTDOWN procedure is performed according to the current standard, which provides graceful closure of the SCTP association, and guarantees all outstanding data delivered.

Re-establishment of the SCTP association may be triggered in any suitable manner. In certain embodiments, re-establishment of the SCTP association may be triggered by the eNB. In certain embodiments, re-establishment of the SCTP association may be triggered by the MME. Various example embodiments related to re-establishment of the SCTP association are described in more detail below in relation to FIGS. 15-18.

Figure 15:
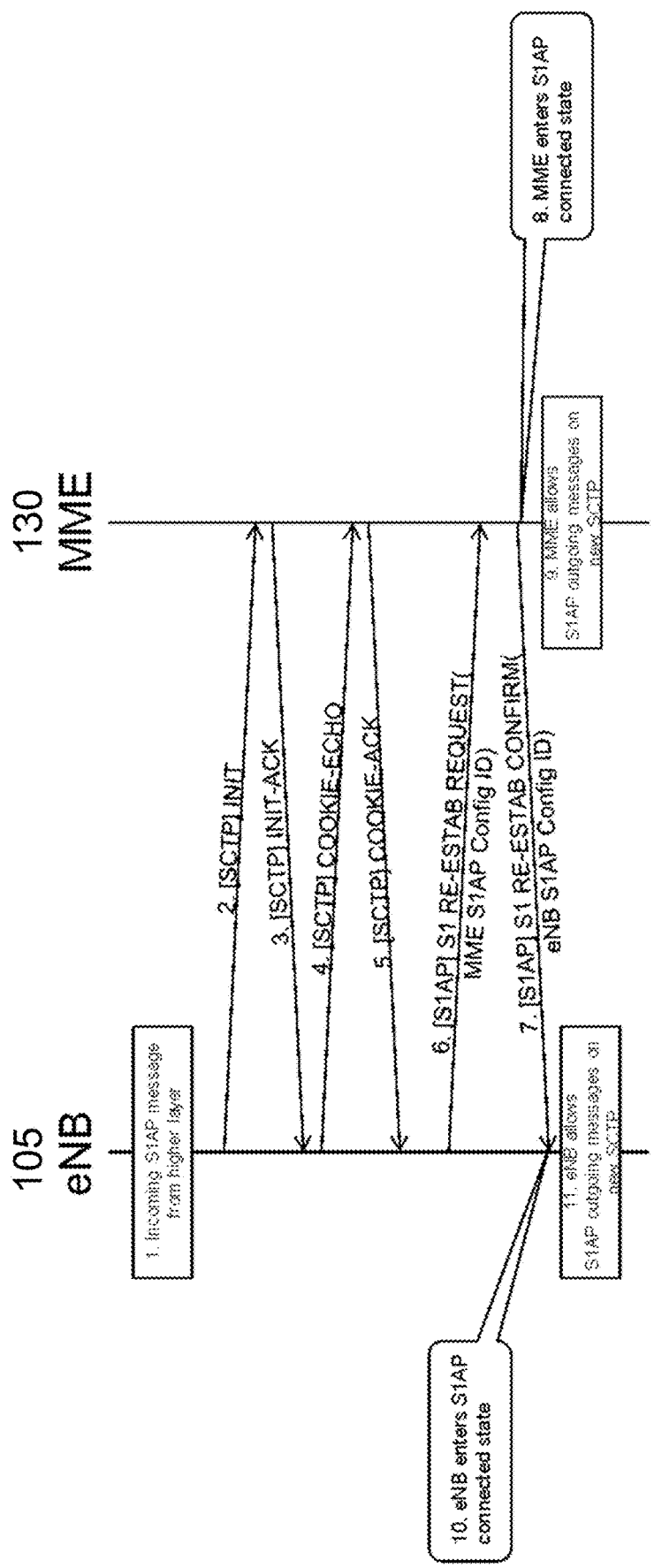
FIG. 15 illustrates an example of re-establishment of the SCTP association that is triggered by the eNB, in accordance with certain embodiments.

FIG. 15 illustrates an example of re-establishment of the SCTP association that is triggered by the eNB, in accordance with certain embodiments. More particularly, FIG. 15 illustrates the sequence for re-establishment of the SCTP association on S1AP connection due to activity in cases where eNB 105 triggers the re-establishment. In order to apply this procedure, it may be required that the parameter eNB S1AP Configuration ID be included in S1 SETUP REQUEST message and/or eNB Configuration Update signals and the MME S1AP Configuration ID parameter be presented in the S1 SETUP CONFIRM message during the S1 setup procedure and/or MME Configuration Update signals (as described above).

At step 15-1, activity on S1AP is detected by eNB 105 as an outgoing S1AP message is triggered. At steps 15-2 through 15-5, eNB 105 establishes an SCTP association with MME 130 according to the current standard. After the new SCTP association has been established, at step 15-6 eNB 105 transmits an S1 RE-ESTABLISH REQUEST message to MME 130 through the new SCTP association. The S1 RE-ESTABLISH REQUEST message includes the MME S1AP Config ID obtained during the S1 SETUP procedure as a parameter. The MME S1AP Config ID parameter is used for identifying the S1AP instance on MME 130.

After the S1 RE-ESTABLISH REQUEST message has been received, MME 130 uses the MME S1AP Config ID to map the correct S1AP context to the new SCTP association, and at step 15-7 transmits an S1 RE-ESTABLISH CONFIRM message to eNB 105 through the new SCTP association, with the eNB S1AP Config ID parameter obtained during the S1 SETUP procedure as a parameter. After the S1 RE-ESTABLISH REQUEST message has been received, at step 15-8 MME 130 enters the S1AP CONNECTED state. After the S1 RE-ESTABLISH REQUEST message has been received, at step 15-9 MME 130 allows the S1AP outgoing messages to be transmitted on the new SCTP association.

After the S1 RE-ESTABLISH CONFIRM message has been received, at step 15-10 eNB 105 enters the S1AP CONNECTED state. After the S1 RE-ESTABLISH CONFIRM message has been received, at step 15-11 eNB 105 allows the S1AP outgoing messages to be transmitted on the new SCTP association.

As described above, in certain embodiments MME 130 triggers the reestablishment of the SCTP association. MME 130 may trigger the reestablishment of the SCTP association in any suitable manner. Three examples of MME triggered reestablishment of the SCTP association are described below in relation to FIGS. 16-18.

Figure 16:
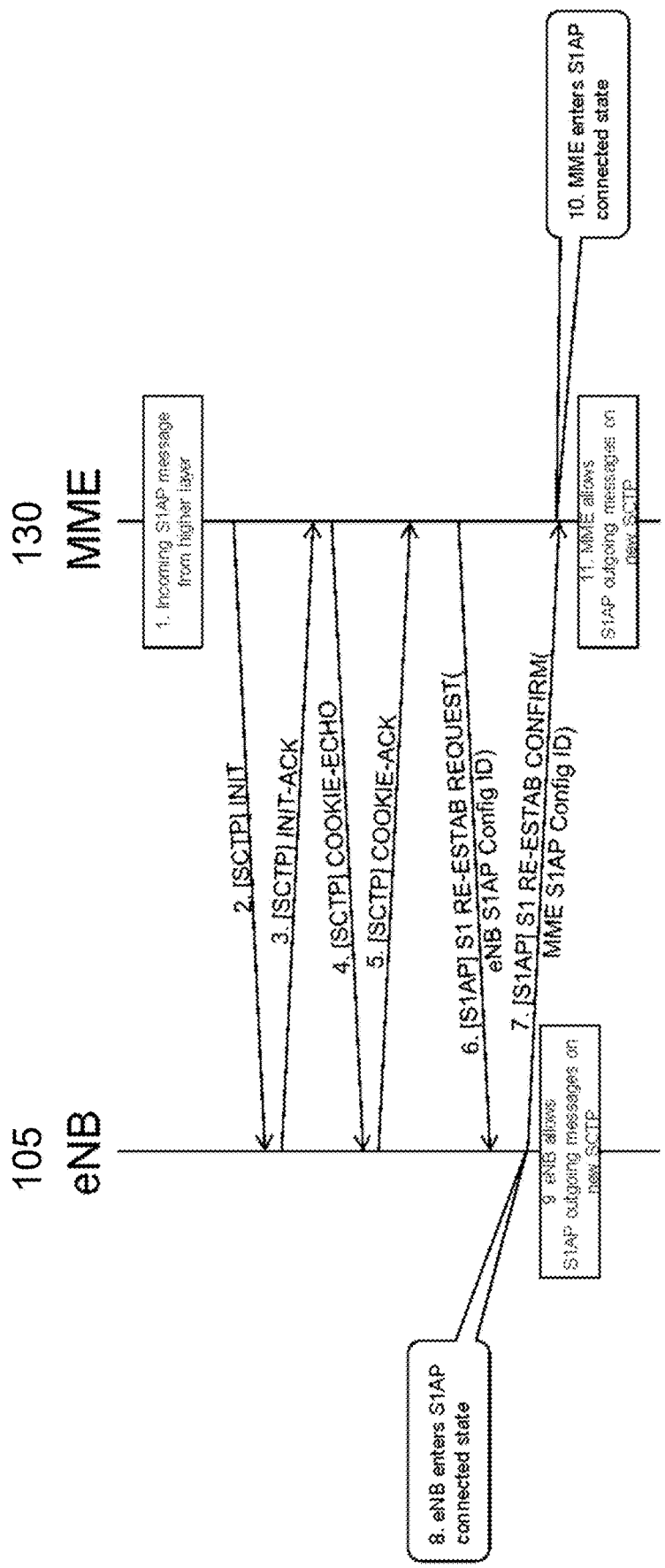
FIG. 16 illustrates one example of re-establishment of the SCTP association that is triggered by the MME, in accordance with certain embodiments.

FIG. 16 illustrates one example of re-establishment of the SCTP association that is triggered by the MME, in accordance with certain embodiments. In the example embodiment of FIG. 16, it may be required that the parameters eNB S1AP Configuration ID and eNB TNL address be presented in the S1 SETUP REQUEST message and MME S1AP Configuration ID be presented in the S1 SETUP CONFIRM message during the S1 setup procedure (as described above). In certain embodiments, if a new address wants to be specified by the eNB or MME respectively at a later stage, the eNB Configuration Update and MME configuration Update messages can be used, respectively.

The sequence of the example embodiment of FIG. 16 is a "mirrored" case of eNB triggered SCTP re-establishment procedure described above in relation to FIG. 15. At step 16-1, activity on S1AP is detected by MME 130 as an incoming S1AP message is triggered. At steps 16-2 through 16-5, MME 130 establishes an SCTP association with eNB 105 according to the current standard. In the example embodiment of FIG. 16, at step 16-2 MME 130 will use the parameter eNB TNL address obtained from the S1 SETUP REQUEST message during the S1 Setup procedure for setting up the SCTP association.

After the new SCTP association has been established, at step 16-6 MME 130 transmits an S1 RE-ESTABLISH REQUEST message to eNB 105 through the new SCTP association. The S1 RE-ESTABLISH REQUEST message includes the eNB S1AP Config ID obtained during the S1 SETUP procedure as a parameter. The eNB S1AP Config ID parameter is used for identifying the S1AP instance on eNB 105.

After the S1 RE-ESTABLISH REQUEST message has been received, eNB 105 uses the eNB S1AP Config ID to map the correct S1AP context to the new SCTP association, and at step 16-7 transmits an S1 RE-ESTABLISH CONFIRM message to MME 130 through the new SCTP association, with the MME S1AP Config ID parameter obtained during the S1 SETUP procedure as a parameter. After the S1 RE-ESTABLISH REQUEST message has been received, at step 16-8 eNB 105 enters the S1AP CONNECTED state. After the S1 RE-ESTABLISH REQUEST message has been received, at step 16-9 eNB 105 allows the S1AP outgoing messages to be transmitted on the new SCTP association.

After the S1 RE-ESTABLISH CONFIRM message has been received, at step 16-10 MME 130 enters the S1AP CONNECTED state. After the S1 RE-ESTABLISH CONFIRM message has been received, at step 16-11 MME 130 allows the S1AP outgoing messages to be transmitted on the new SCTP association.

Figure 17:
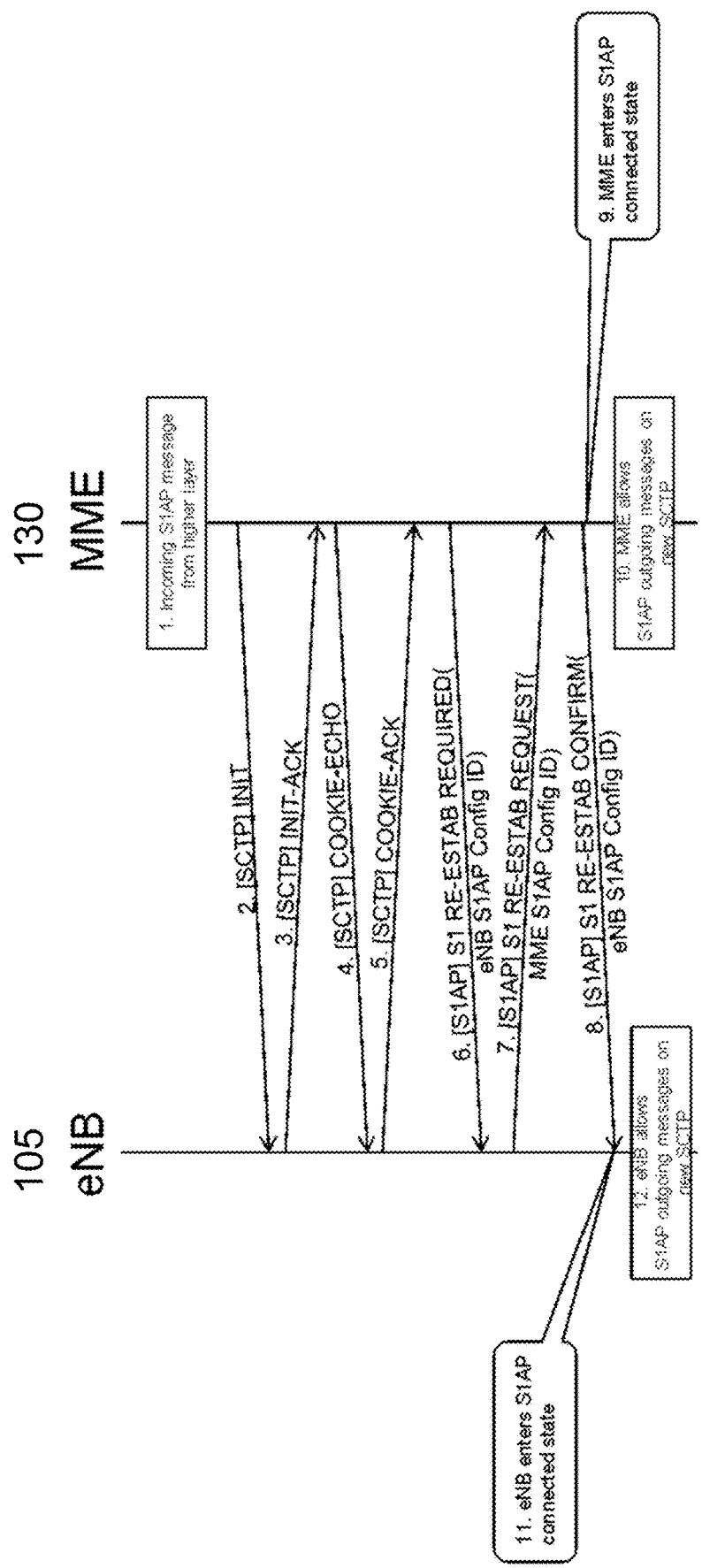
FIG. 17 illustrates another example of re-establishment of the SCTP association that is triggered by the MME, in accordance with certain embodiments.

FIG. 17 illustrates another example of re-establishment of the SCTP association that is triggered by the MME, in accordance with certain embodiments. In the example embodiment of FIG. 17, it may be required that the parameters eNB S1AP Configuration ID and eNB TNL address be presented in the S1 SETUP REQUEST message and/or eNB Configuration Update message and the parameter MME S1AP Configuration ID be presented in the S1 SETUP CONFIRM message during the S1 setup procedure and/or eNB Configuration Update message (as described above).

The example embodiment of FIG. 17 is a combination of the procedures for re-establishment of the SCTP association described above in relation to FIGS. 15 and 16. Steps 17-1 through 17-5 correspond to steps 16-1 through 16-5 described above in relation to FIG. 16.

After the SCTP association is setup by MME 130 at step 17-5, at step 17-6 MME 130 will transmit a new S1AP message S1 RE-ESTAB REQUIRED. The S1 RE-ESTAB REQUIRED message triggers eNB 105 to re-establish the S1AP connection. The S1 RE-ESTAB REQUIRED message includes the parameter eNB S1 Configuration ID indicating which S1AP context the new SCTP association should be mapped to.

After the S1 RE-ESTAB REQUIRED message is received, steps 17-7 through 17-12 correspond to steps 15-6 through 15-11 of the eNB triggered SCTP re-establishment described above in relation to FIG. 15.

Figure 18:
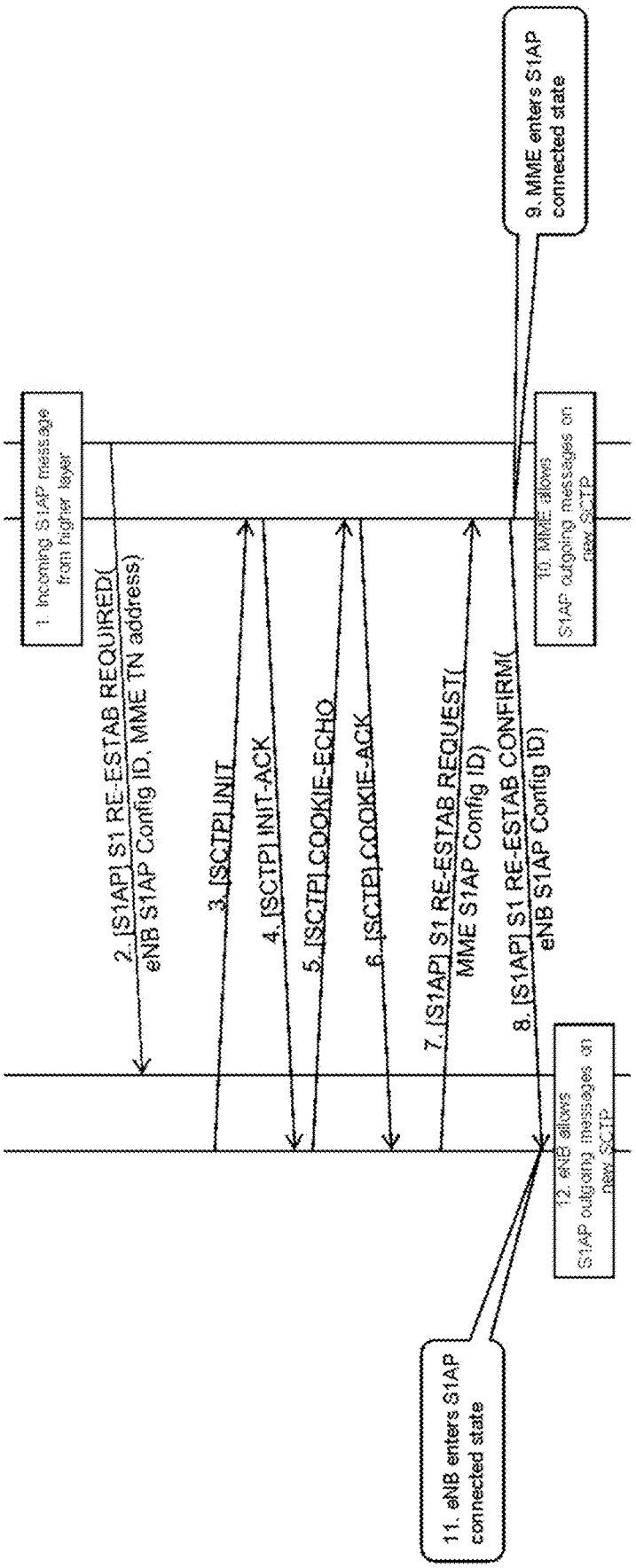
FIG. 18 illustrates another example of re-establishment of the SCTP association that is triggered by the MME, in accordance with certain embodiments.

FIG. 18 illustrates another example of re-establishment of the SCTP association that is triggered by the MME, in accordance with certain embodiments. In the example embodiment of FIG. 18, it may be required that the parameters eNB S1AP Configuration ID and eNB TNL2 address be presented in the S1 SETUP REQUEST message and the parameter MME S1AP Configuration ID be presented in the S1 SETUP CONFIRM message during S1 setup procedure (as described above).

At step 18-1, activity on S1AP is detected by MME 130 as an outgoing S1AP message is triggered. At step 18-2, MME 130 transmits a new S1AP message, S1 RE-ESTAB REQUIRED, using UDP as the TNL to eNB 105. The address for eNB 105 has been provided by eNB 105 during the S1 Setup procedure by the parameter eNB TNL2 address included in the S1 SETUP REQUEST message. In the example embodiment of FIG. 18, the S1 RE-ESTAB REQUIRED message includes the parameters eNB S1AP Configuration ID for informing eNB 105 of the S1AP context that should be resumed. In certain embodiments, an optional parameter MME TN address can also be added. The MME TN address parameter overrides the earlier information indicating which TN address should be used when eNB 105 resumes the SCTP association. Steps 18-3 through 18-12 correspond to steps 15-2 through 15-11 described above in relation to FIG. 15. In the example embodiment of FIG. 18, eNB 105 uses the same procedure as described above in FIG. 15 (in particular, steps 15-2 through 15-11) for eNB triggered SCTP re-establishment for resuming S1AP connection.

In certain embodiments, an alternative TNL channel may be used for single S1AP message transmission. For example, an alternative TNL channel may be established for each direction for allowing the endpoints (e.g., eNB 105 and MME 130) to transmit single S1AP messages when S1AP is in S1AP SUSPENDED state due to inactivity, without re-establishment of the SCTP association. These procedures are described in more detail below in relation to FIGS. 19 and 20. In the example embodiments of FIGS. 19 and 20, it may be required that the parameters eNB S1AP Configuration ID and eNB TNL2 address be presented in the S1 SETUP REQUEST message, and the parameters MME S1AP Configuration ID and MME TNL2 address be presented in the S1 SETUP CONFIRM message during the S1 setup procedure. In certain embodiments, address information may also be included in the eNB/MME Configuration Update signals. In certain embodiments, this alternative channel can be used only when the S1AP is in S1AP SUSPENDED state, otherwise delivery will not be able to be guaranteed. In certain embodiments, to enable supervision of the availability of these alternative channels, a periodic keep-alive signal can be introduced on these alternative channels.

Figure 19:
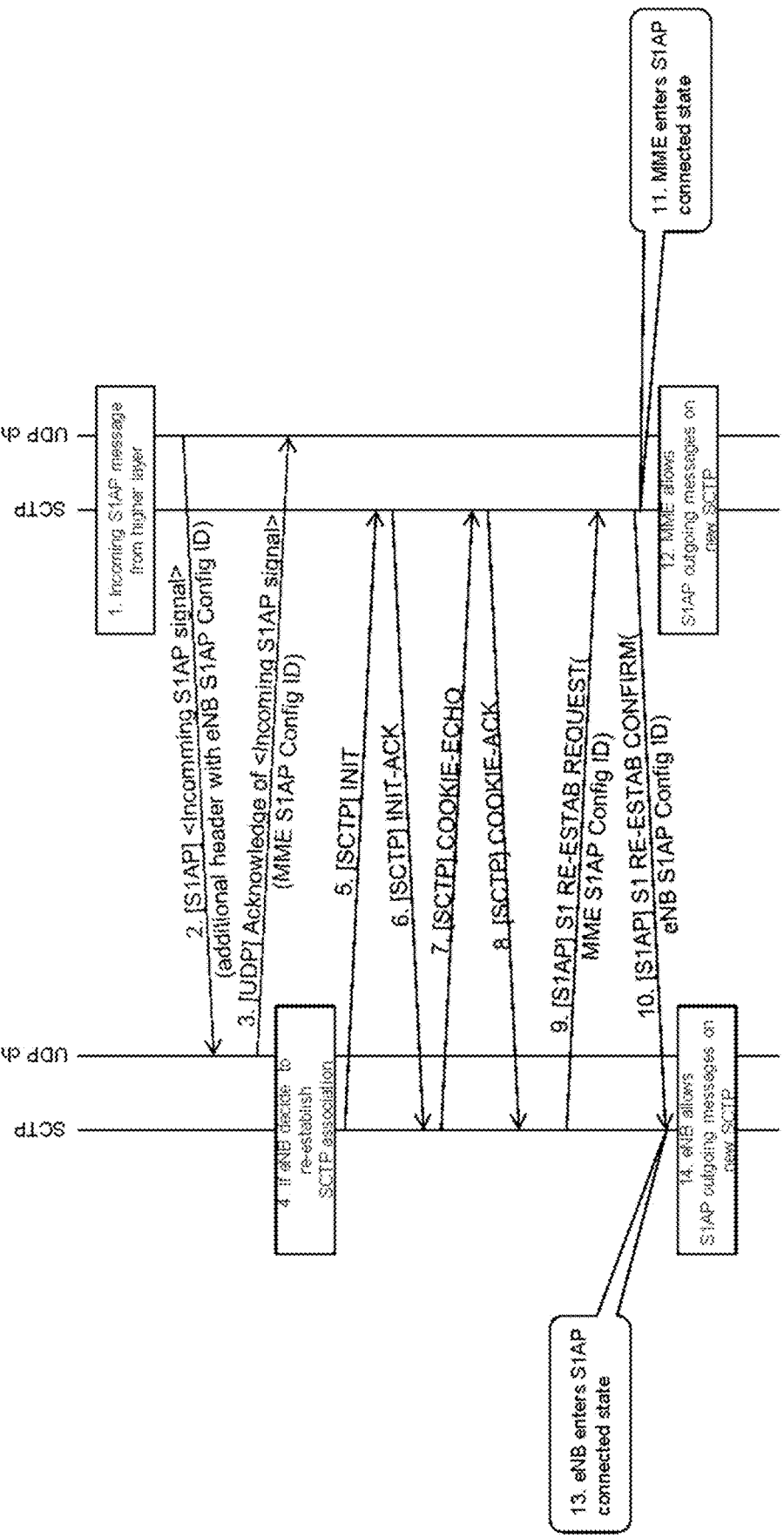
FIG. 19 illustrates an example of an alternative TNL channel for single S1AP message transmission from an MME, in accordance with certain embodiments.

FIG. 19 illustrates an example of an alternative TNL channel for single S1AP message transmission from an MME, in accordance with certain embodiments. At step 19-1, S1AP is in SUSPENDED state due to inactivity. An alternative channel is available from MME 130 to eNB 105, and at step 19-1 an incoming message arrives to MME 130 from a higher layer. At step 19-2, the received S1AP message is transmitted through the alternative channel (e.g., UDP channel in the example embodiment of FIG. 19). In certain embodiments, an additional header is encapsulated in this message with the parameter eNB S1AP Configuration ID in order for eNB 105 to map to the correct S1AP context. In certain embodiments, no further S1AP signal can be transmitted after step 19-2 until an acknowledge message is received at step 19-3 from eNB 105.

After the S1AP message is received, eNB 105 delivers this message to a higher layer mapped to the correct S1AP context according to the eNB S1AP Configuration ID. eNB 105 replies to MME 130 at step 19-3 with an acknowledge message with the parameter MME S1AP Configuration ID for mapping of the S1AP context. At steps 19-4 through 19-14, eNB 105 can, after receiving the S1AP message, determine whether the S1AP should be resumed or not. If so, S1AP re-establishment can be executed.

Figure 20:
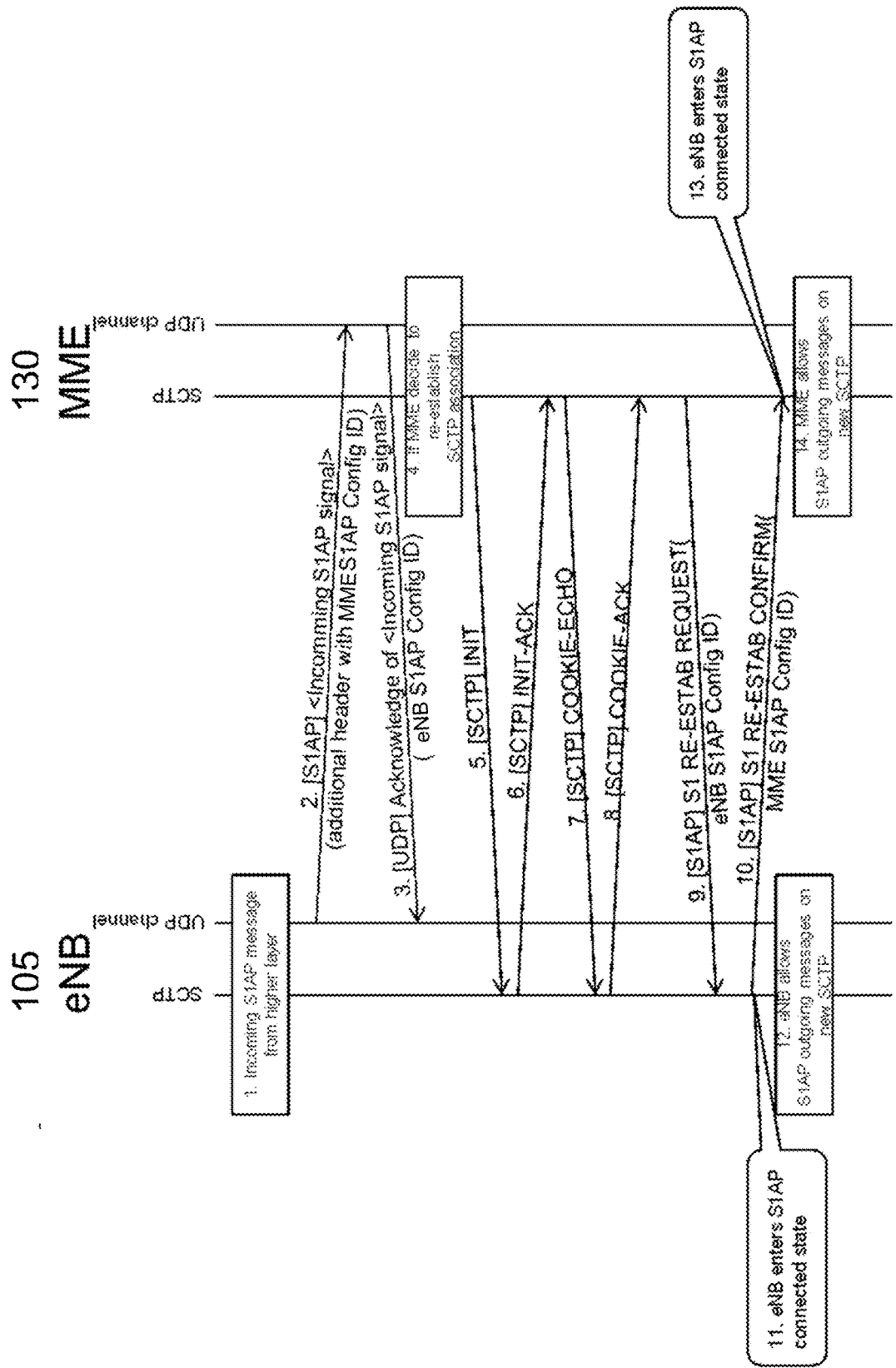
FIG. 20 illustrates an example of an alternative TNL channel for single S1AP message transmission from an eNB, in accordance with certain embodiments.

FIG. 20 illustrates an example of an alternative TNL channel for single S1AP message transmission from an eNB, in accordance with certain embodiments. At step 20-1, S1AP is in SUSPENDED state due to inactivity. An alternative channel is available from eNB 105 to MME 130, and at step 20-1 an incoming message arrives to eNB 105 from a higher layer. At step 20-2, the received S1AP message is transmitted through the alternative channel (e.g., UDP channel in the example embodiment of FIG. 20). In certain embodiments, an additional header is encapsulated in this message with the parameter "MME S1AP Configuration ID" in order for MME 130 to map to the correct S1AP context. In certain embodiments, no further S1AP signal can be transmitted after step 20-2 until an acknowledge message is received at step 20-3 from MME 130.

After the S1AP message is received, MME 130 delivers this message to a higher layer mapped to the correct S1AP context according to the MME S1AP Configuration ID. MME 130 replies to eNB 105 at step 19-3 with an acknowledge message with the parameter eNB S1AP Configuration ID for mapping of the S1AP context. At steps 20-4 through 20-14, MME 130 can, after receiving the S1AP message, determine whether the S1AP should be resumed or not. If so, S1AP re-establishment can be executed. In the example of FIG. 20, the example of MME initiated S1AP re-establishment described above in relation to FIG. 16 has been shown in the sequence diagram of FIG. 20 as an example.

Figure 21:
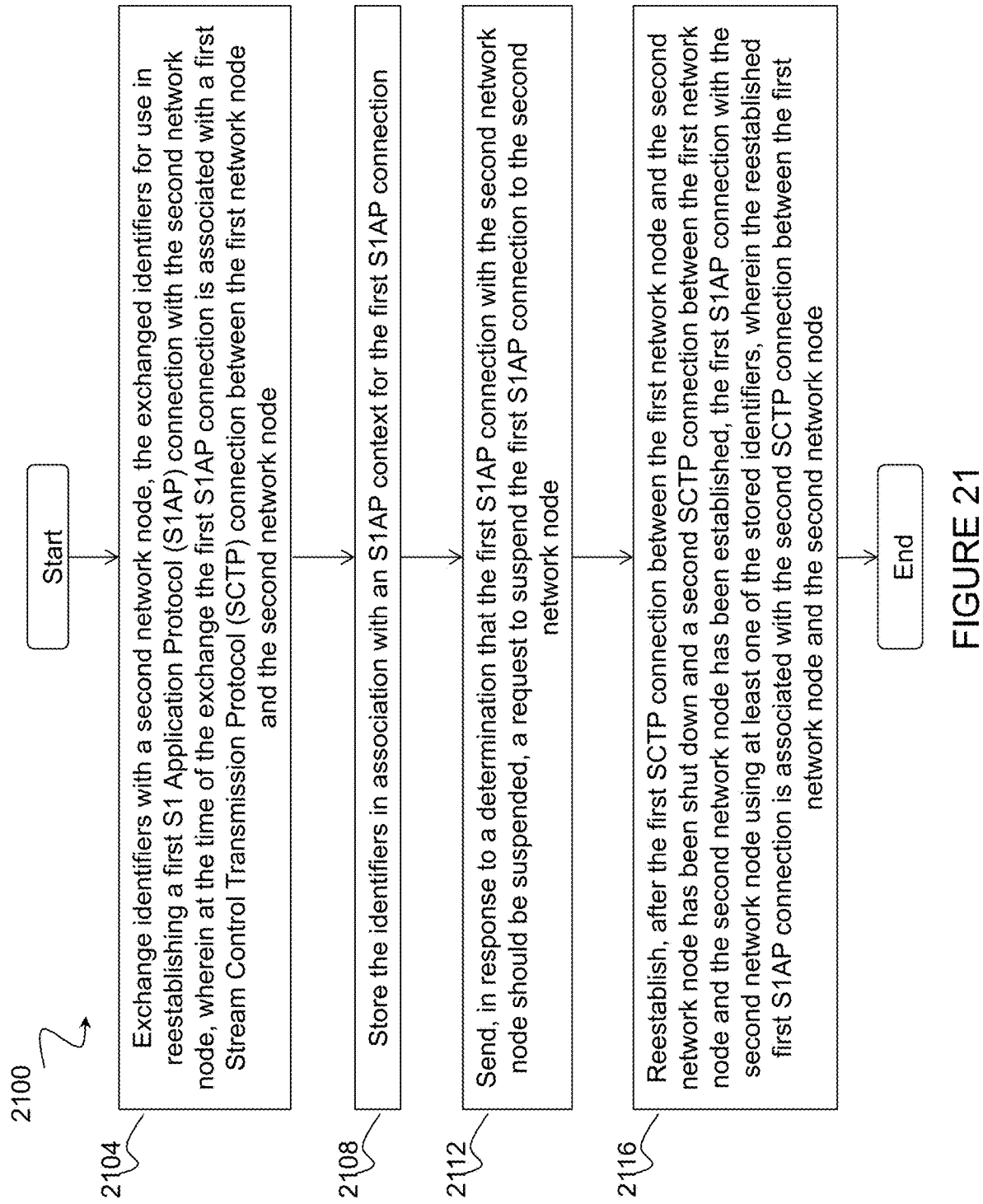
FIG. 21 is a flow diagram of a method in a first network node, in accordance with certain embodiments.

FIG. 21 is a flow diagram of a method 2100 in a first network node, in accordance with certain embodiments. Method 2100 begins at step 2104, where the first network node exchanges identifiers with a second network node. The exchanged identifiers are for use in reestablishing a first S1AP connection with the second network node. At the time of the exchange, the first S1AP connection is associated with a first SCTP connection between the first network node and the second network node. In certain embodiments, the first network node may be an eNB; and the second network node may be an MME. In certain embodiments, the first network node may be an MME; and the second network node may be an eNB.

In certain embodiments, the identifiers may be exchanged in connection with a setup procedure for establishing the first S1AP connection with the second network node. Exchanging identifiers with the second network node may comprise sending a first identifier associated with the first network node to the second network node in connection with the setup procedure for establishing the first S1AP connection with the second network node; and receiving, from the second network node, a second identifier associated with the second network node in connection with the setup procedure for establishing the S1AP connection with the second network node. In certain embodiments, the first network node may be an evolved eNB, and the method may comprise sending, to the second network node, at least one of: a first TNL address for use by the second network node to trigger an SCTP association; and a second TNL address, the second TNL address for use by the second network node to trigger the reestablishment of the first S1 AP connection in association with the second SCTP connection between the first network node and the second network node.

At step 2108, the first network node stores the identifiers in association with an S1AP context for the first S1AP connection. At step 2112, the first network node sends, in response to a determination that the first S1AP connection with the second network node should be suspended, a request to suspend the first S1AP connection to the second network node.

In certain embodiments, the first network node may be an MME, and the method may comprise receiving, from the second network node, at least one of: a first TNL address for use in triggering an SCTP association; and a second TNL address, the second TNL address for use in one or more of triggering the reestablishment of the first S1AP connection in association with the second SCTP connection between the first network node and the second network node and transmitting a single S1AP message transmission to the second network node. The method may comprise sending, to the second network node using the second TNL address, a request to reestablish the first S1 AP connection in association with the second SCTP connection between the first network node and the second network node.

In certain embodiments, the method may comprise initiating, after receiving or sending an S1AP message over the first SCTP connection between the first network node and the second network node, an inactivity timer; determining that the first S1AP connection should be suspended if the inactivity timer expires, wherein the request to suspend the first S1AP connection is in response to the determination that the first S1AP connection should be suspended; and entering an S1 AP suspended state. In certain embodiments, initiating the inactivity timer may comprise starting or restarting the inactivity timer. The request to suspend the first S1AP connection may comprise at least one of: a cause value indicating that the suspension is due to inactivity; and a TNL address, the TNL address for use by the second network node to trigger the reestablishment of the first S1AP connection in association with the second SCTP connection between the first network node and the second network node. In certain embodiments, the method may comprise initiating a suspension timer after sending the request to suspend the first S1AP connection to the second network node; and entering an S1AP disconnected state if the suspension timer expires. In certain embodiments, the method may comprise sending, while in the S1AP suspended state and before the first S1AP connection with the second network node has been reestablished, an S1AP message using an alternative TNL channel.

In certain embodiments, the method may comprise receiving, while in the S1AP suspended state and before the first S1AP connection with the second network node has been reestablished, an S1AP message using an alternative TNL channel; and determining whether the first S1AP connection with the second network node should be reestablished. In certain embodiments, the method may comprise detecting activity on the first S1AP connection; establishing the second SCTP connection between the first network node and the second network node; and sending, to the second network node, a request to reestablish the first S1AP connection with the second network node, the request including at least one of the stored identifiers, the at least one of the stored identifiers comprising an identifier associated with the second network node. The request to reestablish the first S1AP connection with the second network node may be sent using UDP.

At step 2116, the first network node reestablishes, after the first SCTP connection between the first network node and the second network node has been shut down and a second SCTP connection between the first network node and the second network node has been established, the first S1AP connection with the second network node using at least one of the stored identifiers. The reestablished first S1AP connection is associated with the second SCTP connection between the first network node and the second network node.

In certain embodiments, reestablishing the first S1AP connection with the second network node using at least one of the stored identifiers may comprise: sending, to the second network node, a request to reestablish the first S1AP connection with the second network node, the request comprising at least one of the exchanged identifiers, wherein the at least one of the exchanged identifiers is associated with the second network node. In certain embodiments, reestablishing the first S1AP connection with the second network node using at least one of the stored identifiers may comprise receiving, from the second network node, a request to reestablish the first S1AP connection with the second network node, the request comprising at least one of the exchanged identifiers, wherein the at least one of the exchanged identifiers is associated with the first network node; and mapping the received identifier associated with the first network node to the S1AP context for the first S1AP connection, wherein the mapping is based on the identifiers stored in association with the S1AP context for the first S1AP connection.

Figure 22:
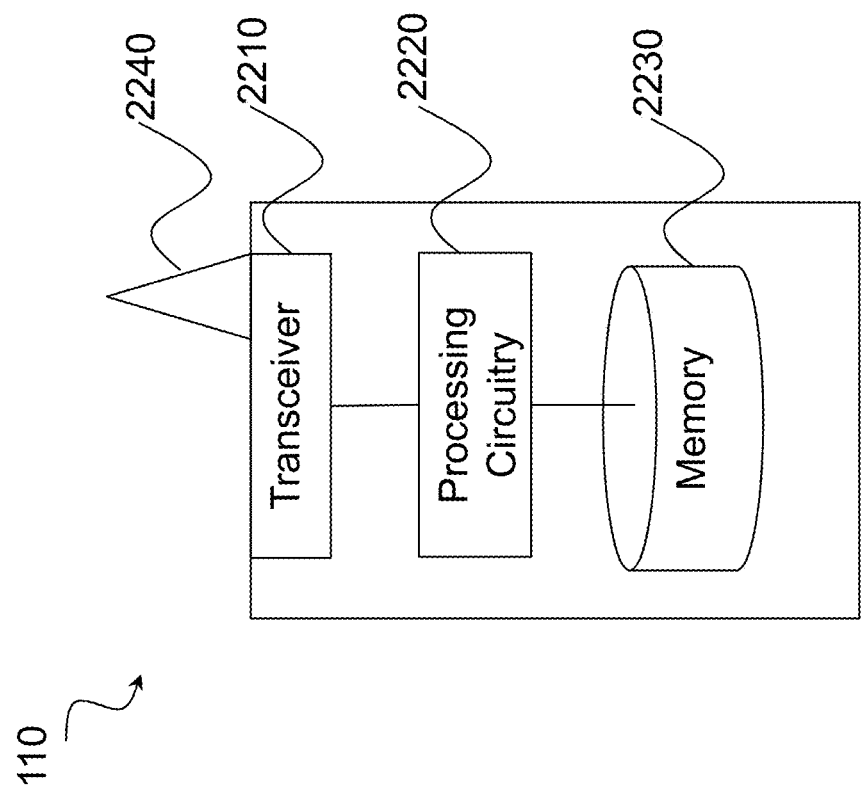
FIG. 22 is a block schematic of an exemplary wireless device, in accordance with certain embodiments.

FIG. 22 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 2210, processing circuitry 2220, and memory 2230. In some embodiments, transceiver 2210 facilitates transmitting wireless signals to and receiving wireless signals from network node 115 (e.g., via antenna 2240), processing circuitry 2220 executes instructions to provide some or all of the functionality described above as being provided by wireless device 110, and memory 2230 stores the instructions executed by processing circuitry 2220.

Processing circuitry 2220 may include any suitable combination of hardware and software implemented in one or more modules to execute instructions and manipulate data to perform some or all of the described functions of wireless device 110, such as the functions of wireless device 110 described above in relation to FIGS. 1-21. In some embodiments, processing circuitry 2220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 2230 is generally operable to store instructions, such as a computer program, software, an application including one or more of logic, rules, algorithms, code, tables, etc. and/or other instructions capable of being executed by processing circuitry 2220. Examples of memory 2230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 2220.

Other embodiments of wireless device 110 may include additional components beyond those shown in FIG. 22 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 2220. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 23:
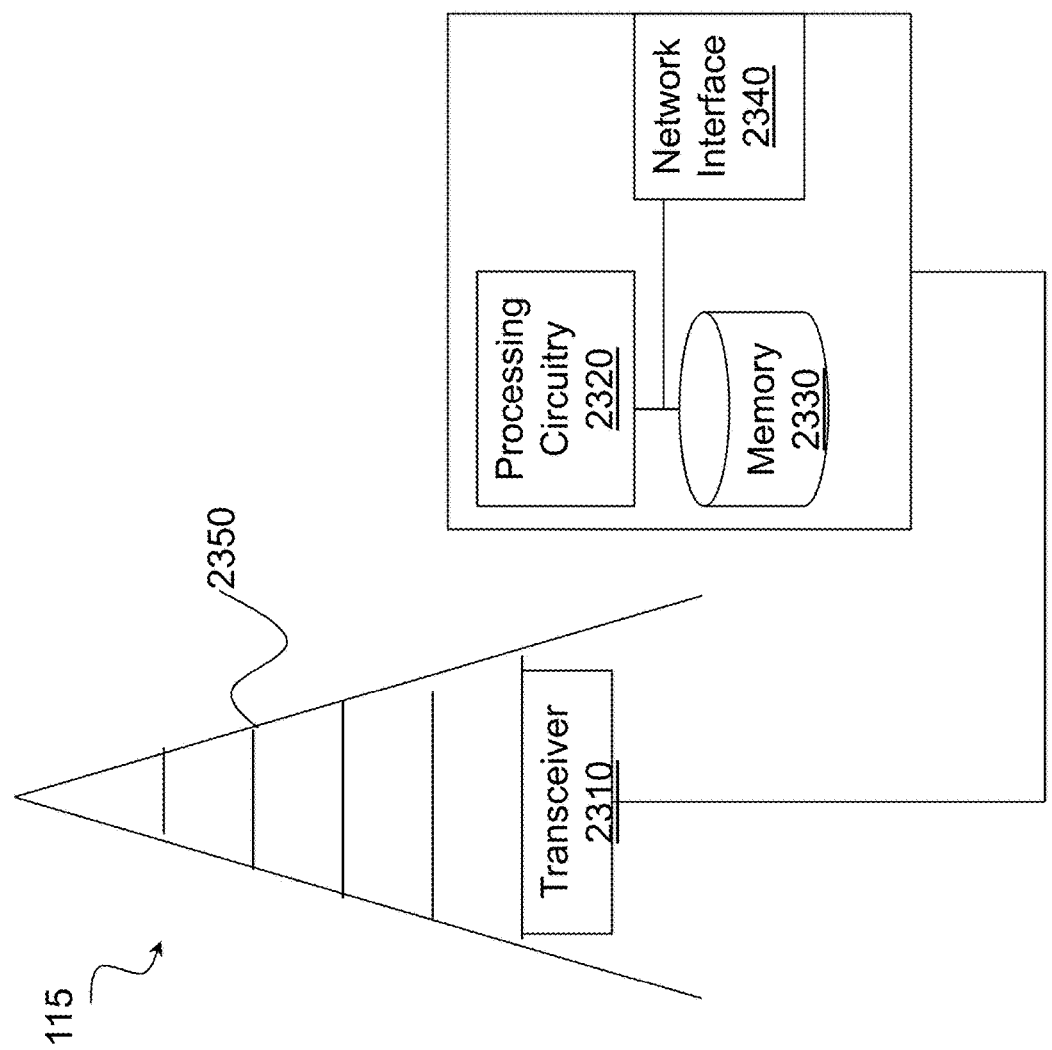
FIG. 23 is a block schematic of an exemplary network node, in accordance with certain embodiments.

FIG. 23 is a block schematic of an exemplary network node 115, in accordance with certain embodiments. Network node 115 may be any type of radio network node or any network node that communicates with a UE and/or with another network node. Examples of network node 115 include an eNodeB (e.g., eNB 105 described above), a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, Multi-cell/multicast Coordination Entity (MCE), core network node (e.g., MSC, MME (e.g., MME 130 described above), etc.), any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 2310, processing circuitry 2320, memory 2330, and network interface 2340. In some embodiments, transceiver 2310 facilitates transmitting wireless signals to and receiving wireless signals from wireless device 110 (e.g., via antenna 2350), processing circuitry 2320 executes instructions to provide some or all of the functionality described above as being provided by a network node 115, memory 2330 stores the instructions executed by processing circuitry 2320, and network interface 2340 communicates signals to backend network components, such as a gateway, switch, router, Internet, Public Switched Telephone Network (PSTN), core network nodes or radio network controllers 130, etc.

Processing circuitry 2320 may include any suitable combination of hardware and software implemented in one or more modules to execute instructions and manipulate data to perform some or all of the described functions of network node 115, such as those described above in relation to FIGS. 1-21. In some embodiments, processing circuitry 2320 may include, for example, one or more computers, one or more central processing units (CPUs), one or more microprocessors, one or more applications, and/or other logic.

Memory 2330 is generally operable to store instructions, such as a computer program, software, an application including one or more of logic, rules, algorithms, code, tables, etc. and/or other instructions capable of being executed by processing circuitry 2320. Examples of memory 2330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 2340 is communicatively coupled to processing circuitry 2320 and may refer to any suitable device operable to receive input for network node 115, send output from network node 115, perform suitable processing of the input or output or both, communicate to other devices, or any combination of the preceding. Network interface 2340 may include appropriate hardware (e.g., port, modem, network interface card, etc.) and software, including protocol conversion and data processing capabilities, to communicate through a network.

Other embodiments of network node 115 may include additional components beyond those shown in FIG. 23 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 24:
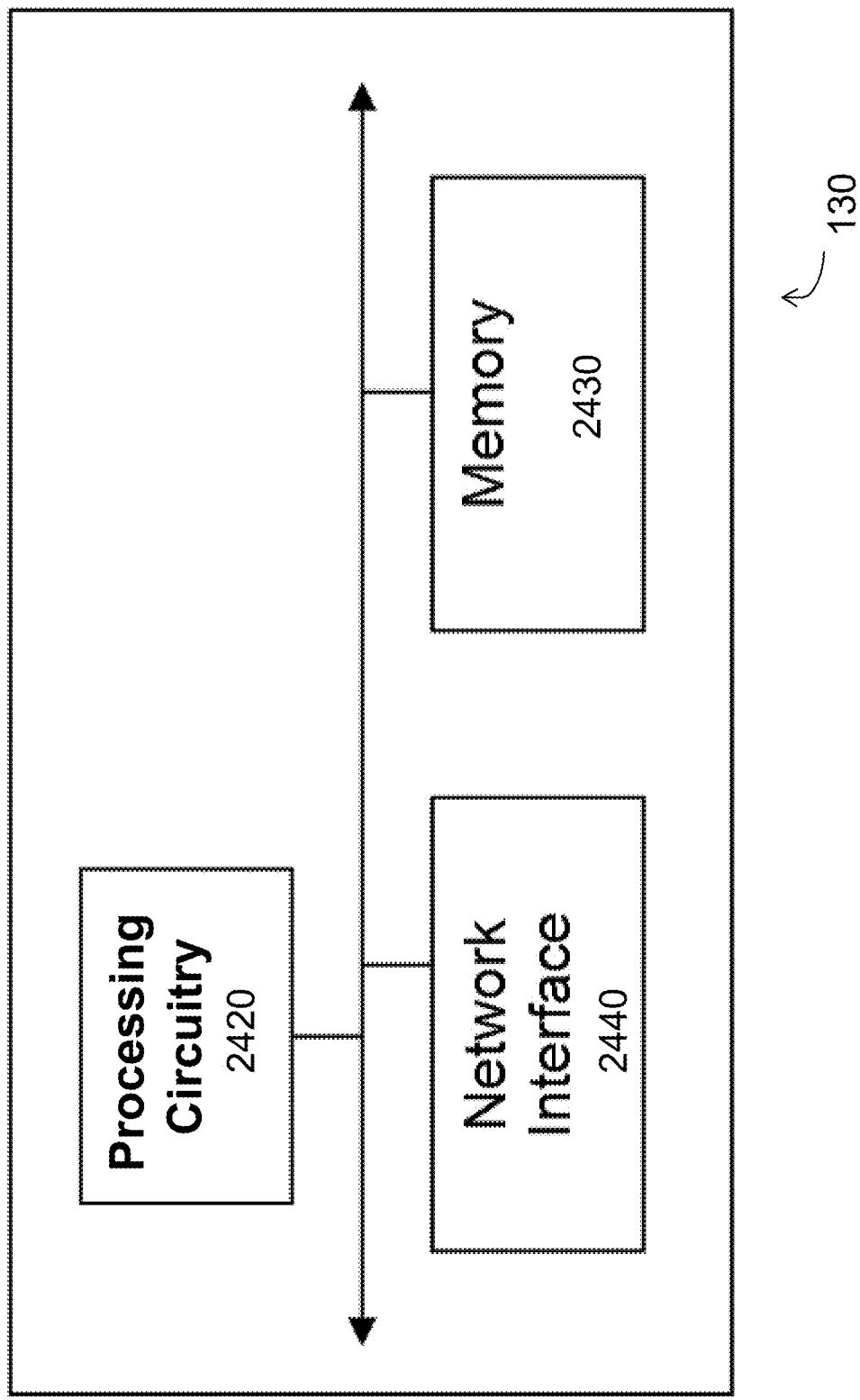
FIG. 24 is a block schematic of an exemplary radio network controller or core network node, in accordance with certain embodiments.

FIG. 24 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 2420, memory 2430, and network interface 2440. In some embodiments, processing circuitry 2420 executes instructions to provide some or all of the functionality described above as being provided by the network node, memory 2430 stores the instructions executed by processing circuitry 2420, and network interface 2440 communicates signals to any suitable node, such as a gateway, switch, router, Internet, Public Switched Telephone Network (PSTN), network nodes 115, radio network controllers or core network nodes 130, etc.

Processing circuitry 2420 may include any suitable combination of hardware and software implemented in one or more modules to execute instructions and manipulate data to perform some or all of the described functions of the radio network controller or core network node 130. In some embodiments, processing circuitry 2420 may include, for example, one or more computers, one or more central processing units (CPUs), one or more microprocessors, one or more applications, and/or other logic.

Memory 2430 is generally operable to store instructions, such as a computer program, software, an application including one or more of logic, rules, algorithms, code, tables, etc. and/or other instructions capable of being executed by processing circuitry 2420. Examples of memory 2430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 2440 is communicatively coupled to processing circuitry 2420 and may refer to any suitable device operable to receive input for the network node, send output from the network node, perform suitable processing of the input or output or both, communicate to other devices, or any combination of the preceding. Network interface 2440 may include appropriate hardware (e.g., port, modem, network interface card, etc.) and software, including protocol conversion and data processing capabilities, to communicate through a network.

Other embodiments of the network node may include additional components beyond those shown in FIG. 24 that may be responsible for providing certain aspects of the network node's functionality, including any of the functionality described above and/or any additional functionality (including any functionality necessary to support the solution described above).

Figure 25:
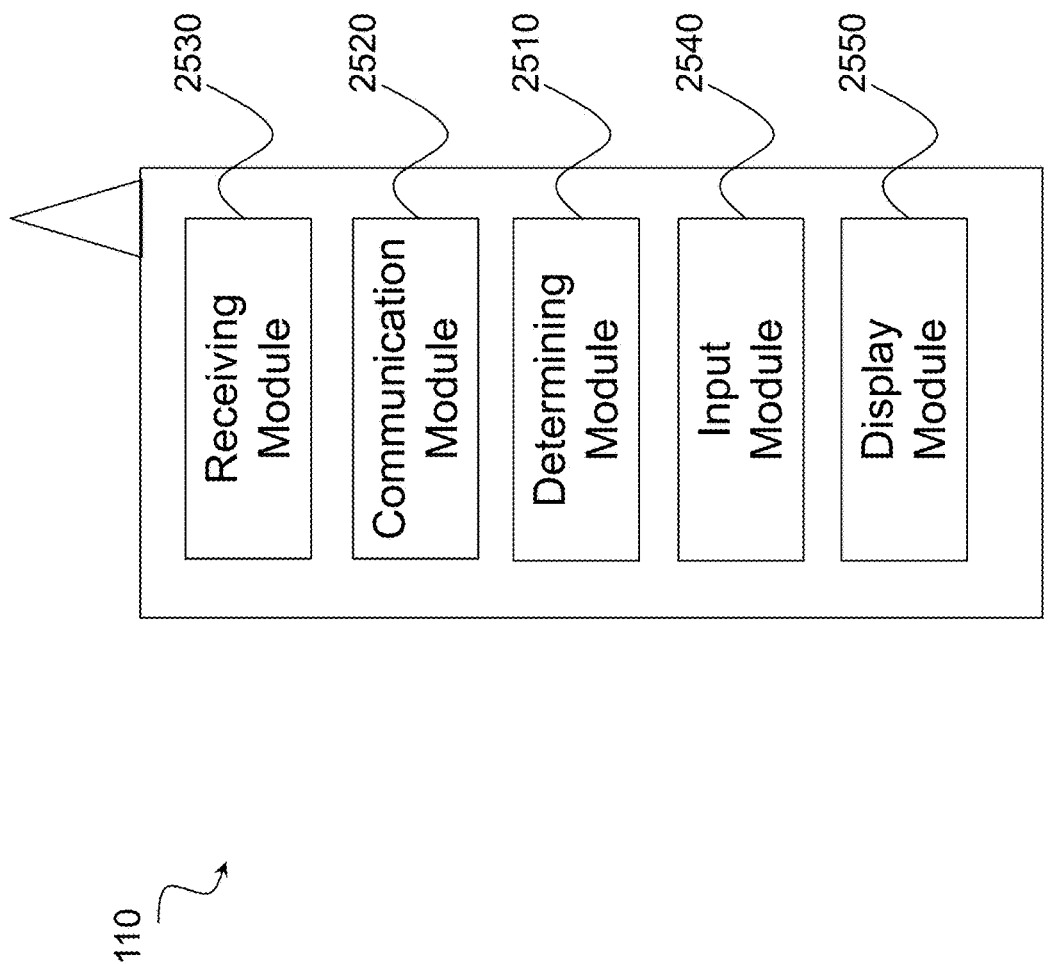
FIG. 25 is a block schematic of an exemplary wireless device, in accordance with certain embodiments.

FIG. 25 is a schematic block diagram of an exemplary wireless device, in accordance with certain embodiments. Wireless device 110 may include one or more modules. For example, wireless device 110 may include a determining module 2510, a communication module 2520, a receiving module 2530, an input module 2540, a display module 2550, and any other suitable modules. In some embodiments, one or more of determining module 2510, communication module 2520, receiving module 2530, input module 2540, display module 2550, or any other suitable module may be implemented using one or more processors, such as processing circuitry 2220 described above in relation to FIG. 22. In certain embodiments, the functions of two or more of the various modules may be combined into a single module. Wireless device 110 may perform the methods for decoupling SCTP and S1AP and for S1AP activity triggered suspend and resume of SCTP described above in relation to FIGS. 1-21.

Determining module 2510 may perform the processing functions of wireless device 110. Determining module 2510 may include or be included in one or more processors, such as processing circuitry 2220 described above in relation to FIG. 22. Determining module 2510 may include analog and/or digital circuitry configured to perform any of the functions of determining module 2510 and/or processing circuitry 2220 described above. The functions of determining module 2510 described above may, in certain embodiments, be performed in one or more distinct modules.

Communication module 2520 may perform the transmission functions of wireless device 110. Communication module 2520 may include a transmitter and/or a transceiver, such as transceiver 2210 described above in relation to FIG. 22. Communication module 2520 may include circuitry configured to wirelessly transmit messages and/or signals. In particular embodiments, communication module 2520 may receive messages and/or signals for transmission from determining module 2510. In certain embodiments, the functions of communication module 2520 described above may be performed in one or more distinct modules.

Receiving module 2530 may perform the receiving functions of wireless device 110. Receiving module 2530 may include a receiver and/or a transceiver. Receiving module 2530 may include a receiver and/or a transceiver, such as transceiver 2210 described above in relation to FIG. 22. Receiving module 2530 may include circuitry configured to wirelessly receive messages and/or signals. In particular embodiments, receiving module 2530 may communicate received messages and/or signals to determining module 2510. The functions of receiving module 2530 described above may, in certain embodiments, be performed in one or more distinct modules.

Input module 2540 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 2510. The functions of input module 2540 described above may, in certain embodiments, be performed in one or more distinct modules.

Display module 2550 may present signals on a display of wireless device 110. Display module 2550 may include the display and/or any appropriate circuitry and hardware configured to present signals on the display. Display module 2550 may receive signals to present on the display from determining module 2510. The functions of display module 2550 described above may, in certain embodiments, be performed in one or more distinct modules.

Determining module 2510, communication module 2520, receiving module 2530, input module 2540, and display module 2550 may include any suitable configuration of hardware and/or software. Wireless device 110 may include additional modules beyond those shown in FIG. 25 that may be responsible for providing any suitable functionality, including any of the functionality described above and/or any additional functionality (including any functionality necessary to support the various solutions described herein).

Figure 26:
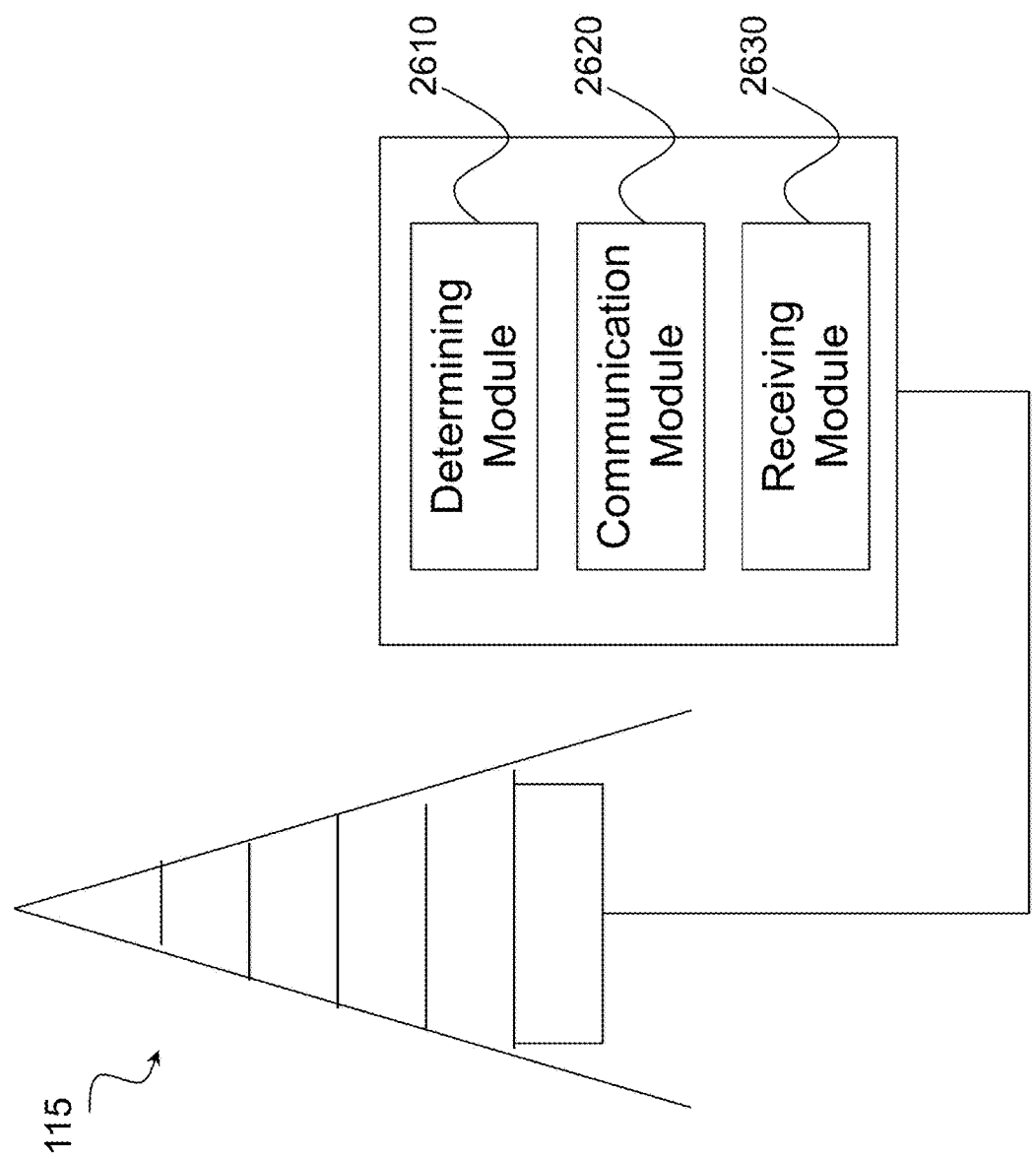
FIG. 26 is a block schematic of an exemplary network node, in accordance with certain embodiments.

FIG. 26 is a schematic block diagram of an exemplary network node 115, in accordance with certain embodiments. Network node 115 may include one or more modules. For example, network node 115 may include determining module 2610, communication module 2620, receiving module 2630, and any other suitable modules. In some embodiments, one or more of determining module 2610, communication module 2620, receiving module 2630, or any other suitable module may be implemented using one or more processors, such as processing circuitry 2320 described above in relation to FIG. 23. In certain embodiments, the functions of two or more of the various modules may be combined into a single module. Network node 115 may perform the methods for decoupling SCTP and S1AP and for S1AP activity triggered suspend and resume of SCTP described above with respect to FIGS. 1-21.

In certain embodiments, network node 115 may be an eNB (e.g., eNB 105 described above). In certain embodiments, network node 115 may be an MME (e.g., MME 130 described above). In either case, network node 115 may perform the functions of first network node 115, second network node 115, eNB 105, or MME 130 described above in relation to FIGS. 1-21. Although certain functions of determining module 2610, communication module 2620, and receiving module 2630 may be described from the perspective of the first network node, the present disclosure contemplates that determining module 2610, communication module 2620, and receiving module 2630 may perform the corresponding actions of the second network node.

Determining module 2610 may perform the processing functions of network node 115. For example, determining module 2610 may exchange identifiers with a second network node, the exchanged identifiers for use in reestablishing a first S1 Application Protocol (S1AP) connection with the second network node. As another example, determining module 2610 may store the identifiers in association with an S1AP context for the first S1AP connection. As still another example, determining module 2610 may re-establish, after the first SCTP connection between the first network node and the second network node has been shut down and a second SCTP connection between the first network node and the second network node has been established, the first S1AP connection with the second network node using at least one of the stored identifiers. As yet another example, determining module 2610 may map the received identifier associated with the first network node to the S1AP context for the first S1AP connection, wherein the mapping is based on the identifiers stored in association with the S1AP context for the first S1AP connection. As another example, determining module 2610 may initiate, after receiving or sending an S1AP message over the first SCTP connection between the first network node and the second network node, an inactivity timer. As another example, determining module 2610 may determine that the first S1AP connection should be suspended if the inactivity timer expires. As another example, determining module 2610 may enter an S1AP suspended state. As another example, determining module 2610 may initiate a suspension timer after sending the request to suspend the first S1AP connection to the second network node. As another example, determining module 2610 may enter an S1AP disconnected state if the suspension timer expires. As another example, determining module 2610 may determine whether the first S1AP connection with the second network node should be reestablished. As still another example, determining module 2610 may detect activity on the first S1AP connection. As another example, determining module 2610 may establish the second SCTP connection between the first network node and the second network node.

Determining module 2610 may include or be included in one or more processors, such as processing circuitry 2320 described above in relation to FIG. 23. Determining module 2610 may include analog and/or digital circuitry configured to perform any of the functions of determining module 2610 and/or processing circuitry 2320 described above. The functions of determining module 2610 may, in certain embodiments, be performed in one or more distinct modules.

Communication module 2620 may perform the transmission functions of network node 115. As one example, communication module 2620 may exchange identifiers with a second network node, the exchanged identifiers for use in reestablishing a first S1 Application Protocol (S1AP) connection with the second network node. As another example, communication module 2620 may send, in response to a determination that the first S1AP connection with the second network node should be suspended, a request to suspend the first S1AP connection to the second network node. As still another example, communication module 2620 may send a first identifier associated with the first network node to the second network node in connection with the setup procedure for establishing the first S1AP connection with the second network node. As yet another example, in certain embodiments network node 115 may be an eNB, and communication module 2620 may send, to the second network node, at least one of: a first Transport Network Layer (TNL) address for use by the second network node to trigger an SCTP association; and a second TNL address, the second TNL address for use by the second network node to trigger the reestablishment of the first S1AP connection in association with the second SCTP connection between the first network node and the second network node. As another example, communication module 2620 may send, to the second network node using the second TNL address, a request to reestablish the first S1AP connection in association with the second SCTP connection between the first network node and the second network node. As another example, communication module 2620 may send, to the second network node, a request to reestablish the first S1AP connection with the second network node, the request comprising at least one of the exchanged identifiers, wherein the at least one of the exchanged identifiers is associated with the second network node. As still another example, communication module 2620 may send, while in the S1AP suspended state and before the first S1AP connection with the second network node has been reestablished, an S1AP message using an alternative TNL channel. As another example, communication module 2620 may send, to the second network node, a request to reestablish the first S1AP connection with the second network node, the request including at least one of the stored identifiers, the at least one of the stored identifiers comprising an identifier associated with the second network node.

Communication module 2620 may transmit messages to one or more of wireless devices 110. Communication module 2620 may include a transmitter and/or a transceiver, such as transceiver 2310 described above in relation to FIG. 23. Communication module 2620 may include circuitry configured to wirelessly transmit messages and/or signals. In particular embodiments, communication module 2620 may receive messages and/or signals for transmission from determining module 2610 or any other module. The functions of communication module 2620 may, in certain embodiments, be performed in one or more distinct modules.

Receiving module 2630 may perform the receiving functions of network node 115. As one example, receiving module 2630 may exchange identifiers with a second network node, the exchanged identifiers for use in reestablishing a first S1 Application Protocol (S1AP) connection with the second network node. As another example, receiving module 2630 may receive, from the second network node, a second identifier associated with the second network node in connection with the setup procedure for establishing the S1AP connection with the second network node. As still another example, in certain embodiments network node 115 may be an MME, and receiving module 2630 may receive, from the second network node, at least one of: a first TNL address for use in triggering an SCTP association; and a second TNL address, the second TNL address for use in one or more of triggering the reestablishment of the first S1AP connection in association with the second SCTP connection between the first network node and the second network node and transmitting a single S1AP message transmission to the second network node. As yet another example, receiving module 2630 may receive, from the second network node, a request to reestablish the first S1AP connection with the second network node, the request comprising at least one of the exchanged identifiers, wherein the at least one of the exchanged identifiers is associated with the first network node. As another example, receiving module 2630 may receive, while in the S1AP suspended state and before the first S1AP connection with the second network node has been reestablished, an S1AP message using an alternative TNL channel.

Receiving module 2630 may receive any suitable information from a wireless device. Receiving module 2630 may include a receiver and/or a transceiver, such as transceiver 2310 described above in relation to FIG. 23. Receiving module 2630 may include circuitry configured to wirelessly receive messages and/or signals. In particular embodiments, receiving module 2630 may communicate received messages and/or signals to determining module 2610 or any other suitable module. The functions of receiving module 2630 may, in certain embodiments, be performed in one or more distinct modules.

Determining module 2610, communication module 2620, and receiving module 2630 may include any suitable configuration of hardware and/or software. Network node 115 may include additional modules beyond those shown in FIG. 26 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ACK Acknowledgement
AP Access Point
ASIC Application Specific Integrated Circuits
BS Base Station
BSC Base Station Controller
BTS Base Transceiver Station
CDMA Code Division Multiple Access
CN Core Network
CPE Customer Premises Equipment
CPU Central Processing Unit
D2D Device-to-device
DAS Distributed Antenna System
DC Dual Connectivity
DL Downlink
DM Domain Manager
eNB Evolved Node B
EPC Evolved Packet Core
EPDCCH Enhanced Physical Downlink Control Channel
E-SMLC Evolved Serving Mobile Location Center
FDD Frequency Division Duplex
FPGA Field Programmable Gate Array
gNB gNodeB
GSM Global System for Mobile Communication
HeNB Home eNodeB
HeNB GW Home eNodeB Gateway
HSPA High Speed Packet Access
IE Information Element
IP Internet Protocol
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MDT Minimization of Drive Test
MME Mobility Management Entity
MSC Mobile Switching Center
MSR Multi-standard Radio
MTC Machine-Type-Communication
MTU Maximum Transmission Unit
NACK Negative Acknowledgement
NAS Non-Access Stratum
NE Node Element
NM Network Manager
NR New Radio
O&M Operations and Maintenance
OSS Operation and Support System
PDCCH Physical Downlink Control Channel
PDSCH Physical Downlink Shared Channel
PSTN Public Switched Telephone Network
PUSCH Physical Uplink Shared Channel
PUCCH Physical Uplink Control Channel
RAM Random Access Memory
RAN Radio Access Network
RAT Radio Access Technology
RB Resource Block RFC Request for Comments
RNC Radio Network Controller
ROM Read Only Memory
RRC Radio Resource Control
RRH Remote Radio Head
RRU Remote Radio Unit
S1AP S1 Application Protocol
SCTP Stream Control Transmission Protocol
S-GW Serving-Gateway
SON Self-Organizing Network
TDD Time Division Duplex
TN Transport Network
TNL Transport Network Layer
TSN Transmission Sequence Number
UDP User Datagram Protocol
UE User Equipment
UL Uplink
UMB Ultra-Mobile Broadband
UMTS Universal Mobile Telecommunication System
WAN Wide Area Network
WCDMA Wideband Code Division Multiple Access
X2AP X2 Application Protocol

The invention claimed is:

1. A method in a first network node, comprising:
exchanging identifiers with a second network node, the exchanged identifiers for use in reestablishing a first S1 Application Protocol (S1AP) connection with the second network node, wherein the first S1AP connection is associated with a first Stream Control Transmission Protocol (SCTP) connection between the first network node and the second network node, and wherein the identifiers are stored in association with an S1AP context for the first S1AP connection;
initiating, after receiving or sending an S1AP message over the first SCTP connection between the first network node and the second network node, an inactivity timer;
sending, based on the inactivity timer expiring, a request to suspend the first S1AP connection to the second network node, wherein the first network node enters an S1AP suspended state;
receiving, while in the S1AP suspended state and before reestablishing the first S1AP connection with the second network node, an S1AP message using an alternative Transport Network Layer (TNL) channel; and
reestablishing, after the first SCTP connection between the first network node and the second network node has been shut down and a second SCTP connection between the first network node and the second network node has been established, the first S1AP connection with the second network node using at least one of the stored identifiers, wherein the reestablished first S1AP connection is associated with the second SCTP connection between the first network node and the second network node.

2. The method of claim 1, wherein the identifiers are exchanged in connection with a setup procedure for establishing the first S1AP connection with the second network node.

3. The method of claim 2, wherein exchanging identifiers with the second network node comprises:
sending a first identifier associated with the first network node to the second network node in connection with the setup procedure for establishing the first S1AP connection with the second network node; and
receiving, from the second network node, a second identifier associated with the second network node in connection with the setup procedure for establishing the S1AP connection with the second network node.

4. The method of claim 3, wherein the first network node is an evolved NodeB (eNB), and the method comprises:
sending, to the second network node, at least one of:
a first TNL address for use by the second network node to trigger an SCTP association; and
a second TNL address, the second TNL address for use by the second network node to trigger the reestablishment of the first S1AP connection in association with the second SCTP connection between the first network node and the second network node.

5. The method of claim 2, wherein the first network node is a Mobility Management Entity (MME), and the method comprises:
receiving, from the second network node, at least one of:
a first TNL address for use in triggering an SCTP association; and
a second TNL address, the second TNL address for use in one or more of triggering the reestablishment of the first S1AP connection in association with the second SCTP connection between the first network node and the second network node and transmitting a single S1AP message transmission to the second network node.

6. The method of claim 5, comprising:
sending, to the second network node using the second TNL address, a request to reestablish the first S1AP connection in association with the second SCTP connection between the first network node and the second network node.

7. The method of claim 1, wherein reestablishing the first S1AP connection with the second network node using at least one of the stored identifiers comprises:
sending, to the second network node, a request to reestablish the first S1AP connection with the second network node, the request comprising at least one of the exchanged identifiers, wherein the at least one of the exchanged identifiers is associated with the second network node.

8. The method of claim 1, wherein reestablishing the first S1AP connection with the second network node using at least one of the stored identifiers comprises:
receiving, from the second network node, a request to reestablish the first S1AP connection with the second network node, the request comprising at least one of the exchanged identifiers, wherein the at least one of the exchanged identifiers is associated with the first network node; and
mapping the received identifier associated with the first network node to the S1AP context for the first S1AP connection, wherein the mapping is based on the identifiers stored in association with the S1AP context for the first S1AP connection.

9. The method of claim 1, wherein the request to suspend the first S1AP connection comprises at least one of:
a cause value indicating that the suspension is due to inactivity; and
a TNL address, the TNL address for use by the second network node to trigger the reestablishment of the first S1AP connection in association with the second SCTP connection between the first network node and the second network node.

10. The method of claim 1, comprising:
initiating a suspension timer after sending the request to suspend the first S1AP connection to the second network node; and entering, based on the suspension timer expiring, an S1AP disconnected state.

11. The method of claim 1, comprising:
sending, while in the S1AP suspended state and before the first S1AP connection with the second network node has been reestablished, an S1AP message using an alternative TNL channel.

12. The method of claim 1, comprising:
detecting activity on the first S1AP connection;
establishing the second SCTP connection between the first network node and the second network node; and
sending, to the second network node, a request to reestablish the first S1AP connection with the second network node, the request including at least one of the stored identifiers, the at least one of the stored identifiers comprising an identifier associated with the second network node.

13. The method of claim 12, wherein the request to reestablish the first S1AP connection with the second network node is sent using User Datagram Protocol (UDP).

14. The method of claim 1, wherein:
the first network node is an eNB; and
the second network node is an MME.

15. The method of claim 1, wherein:
the first network node is an MME; and
the second network node is an eNB.

16. A first network node, comprising:
processing circuitry to perform operations comprising:
exchanging identifiers with a second network node, the exchanged identifiers for use in reestablishing a first S1 Application Protocol (S1AP) connection with the second network node, wherein the first S1AP connection is associated with a first Stream Control Transmission Protocol (SCTP) connection between the first network node and the second network node, and wherein the identifiers are stored in association with an S1AP context for the first S1AP connection;
initiating, after receiving or sending an S1AP message over the first SCTP connection between the first network node and the second network node, an inactivity timer;
sending, based on the inactivity timer expiring, a request to suspend the first S1AP connection to the second network node, wherein the first network node enters an S1AP suspended state;
receiving, while in the S1AP suspended state and before reestablishing the first S1AP connection with the second network node, an S1AP message using an alternative Transport Network Layer (TNL) channel; and
reestablishing, after the first SCTP connection between the first network node and the second network node has been shut down and a second SCTP connection between the first network node and the second network node has been established, the first S1AP connection with the second network node using at least one of the stored identifiers, wherein the reestablished first S1AP connection is associated with the second SCTP connection between the first network node and the second network node.

17. The first network node of claim 16, wherein the identifiers are exchanged in connection with a setup procedure for establishing the first S1AP connection with the second network node.

18. The first network node of claim 17, wherein exchanging identifiers with the second network node comprises:
sending a first identifier associated with the first network node to the second network node in connection with the setup procedure for establishing the first S1AP connection with the second network node; and
receiving, from the second network node, a second identifier associated with the second network node in connection with the setup procedure for establishing the S1AP connection with the second network node.

19. The first network node of claim 16, wherein the request to suspend the first S1AP connection comprises at least one of:
a cause value indicating that the suspension is due to inactivity; and
a TNL address, the TNL address for use by the second network node to trigger the reestablishment of the first S1AP connection in association with the second SCTP connection between the first network node and the second network node.

20. The first network node of claim 16, the operations further comprising:
initiating a suspension timer after sending the request to suspend the first S1AP connection to the second network node; and
entering, based on the suspension timer expiring, an S1AP disconnected state.

* * * * *